(12) United States Patent
Takahashi et al.

(10) Patent No.: US 6,726,381 B2
(45) Date of Patent: Apr. 27, 2004

(54) FOCAL-PLANE SHUTTER FOR CAMERAS

(75) Inventors: Shigemi Takahashi, Nerima-ku (JP); Yuichirou Usuda, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/139,245

(22) Filed: May 7, 2002

(65) Prior Publication Data

US 2002/0172519 A1 Nov. 21, 2002

(30) Foreign Application Priority Data

May 15, 2001 (JP) ........................................ 2001-145342
May 28, 2001 (JP) ........................................ 2001-158276

(51) Int. Cl.⁷ ................................................ G03B 9/40
(52) U.S. Cl. ........................ 396/486; 396/487; 396/488; 396/493
(58) Field of Search ........................ 396/452, 486–488, 396/493

(56) References Cited

U.S. PATENT DOCUMENTS

| | | | |
|---|---|---|---|
| 4,814,807 A | | 3/1989 | Nakagawa et al. |
| 4,926,202 A | * | 5/1990 | Fukuda et al. ............... 396/486 |
| 5,019,847 A | * | 5/1991 | Tanabe ........................ 396/486 |
| 5,381,199 A | * | 1/1995 | Fukuda ........................ 396/452 |

FOREIGN PATENT DOCUMENTS

| | | |
|---|---|---|
| JP | 60-208739 | 10/1985 |
| JP | 7-20534 | 1/1995 |

* cited by examiner

*Primary Examiner*—D. Rutledge
(74) *Attorney, Agent, or Firm*—Pillsbury Winthrop LLP

(57) ABSTRACT

A focal-plane shutter for a camera is provided with two blade chambers into which a space between two base plates is partitioned by an intermediate plate having an aperture for exposure. A shutter blade group placed in each of the blade chambers is constructed with a plurality of arms whose ends are pivotally mounted to one of the two base plates on the side of the aperture and at least one blade pivotally supported by the arms through individual joint shanks so that working paths of the joint shanks does not run inside the apertures. A wall is provided on at least one of the two base plates so as to project toward the blade chamber side, along the edge of the aperture, and has an inclined face directed toward the aperture of an opposite base plate.

15 Claims, 17 Drawing Sheets

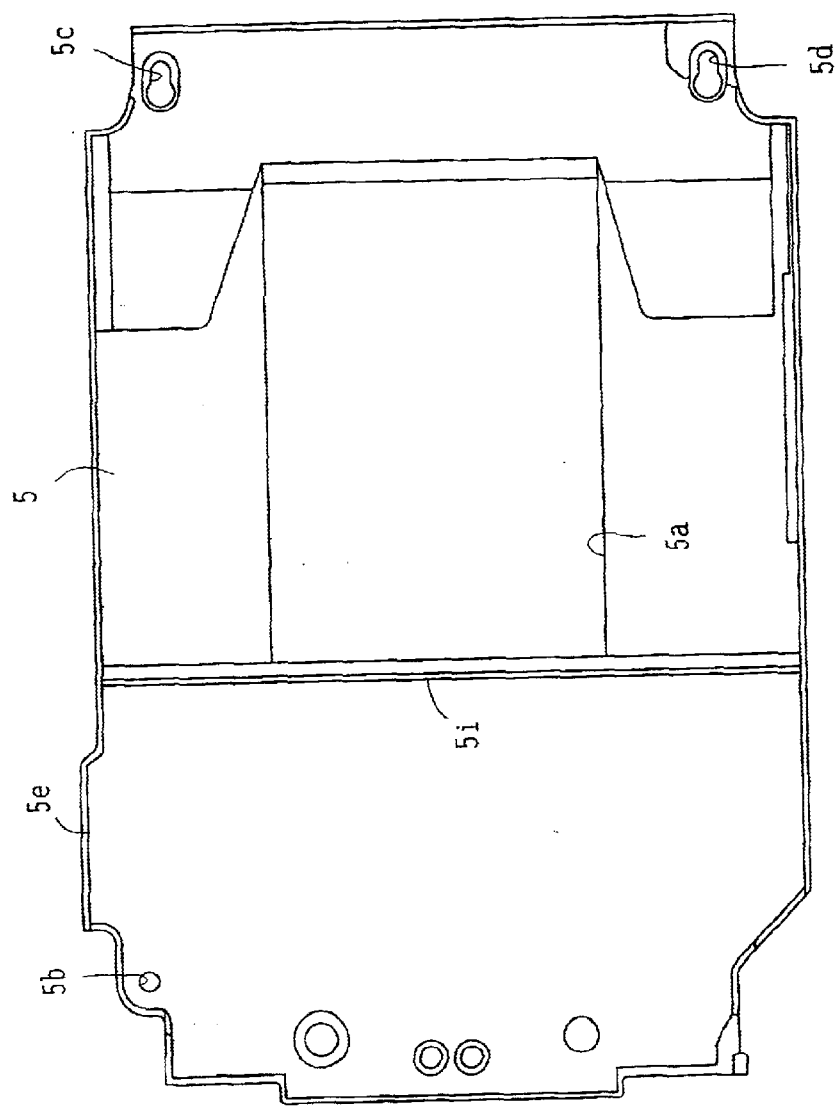

FOCAL-PLANE SHUTTER FOR CAMERAS

BACKGROUND OF THE INVENTION

1. Field of the Invention

This invention relates to a focal-plane shutter for cameras.

2. Description of Related Art

Shutters for cameras are roughly divided into two classes, focal-plane shutters and lens shutters. Focal-plane shutters used in recent years are mainly provided with two shutter blades (a first blade (group) and a second blade (group)), which are separately placed in two blade chambers constructed with three plate members, called a shutter base plate, an intermediate plate, and an auxiliary base plate, respectively. The shutters of this type are used in film cameras and digital cameras as well, and the two shutter blade groups are actuated in turn at a preset interval of time in photography so that an exposure operation is continuously performed, through a slit provided by the shutter blade groups, from one side of a rectangular imaging surface toward its opposite side.

Some of focal-plane shutters used only in digital cameras have a single shutter blade group. In this case, of the three plate members, the intermediate plate is not provided and the shutter base plate and the auxiliary base plate constitute a single blade chamber. In the shutters of this type, the imaging surface is usually exposed to light from an object, and only when photographing is completed, the imaging surface is temporarily covered.

In both types mentioned above, however, the shutter blade groups have the same structure, each with a mechanism in which one or more strip-shaped blades are supported to be rotatable with respect to a plurality of arms whose ends are pivotally mounted to the shutter base plate and thereby a link mechanism of parallelogram is applied. This pivotally supporting structure with the arms and the blades is such that holes provided in the arm and the blades are superposed and the tops of joint shanks which are rivet parts are inserted into the holes from the arm side and are caulked to the blades. The shutter is designed so that each of caulking portions does not project from the sliding surface of the blade in accordance with the shape of the blade, but the head of the joint shank, situated on the shutter base plate side or the auxiliary base plate side, projects from the arm.

The lens shutters, on the other hand, are of two types: a lens shutter located between two photographic lenses and a lens shutter located behind them. Most of such lens shutters are such that an exposure aperture is opened and closed at about the middle thereof. In either type, the lens shutters can be used in both film cameras and digital cameras. When they are used in the digital cameras, the imaging surface is usually exposed to light from the object, and only when photographing is completed, the imaging surface is temporarily closed.

Moreover, some of the lens shutters have an aperture restriction as in a stop mechanism. In this case, when they are used in the film cameras, a closing operation is performed from a preset position of the aperture restriction before a circular exposure aperture is fully opened in photography, while when used in the digital cameras, the aperture is opened at a preset position of the aperture restriction before photography, and the closing operation is temporarily performed only when photographing is completed. Even in such lens shutters, blades and members actuating the blades are connected by fitting structures that the joint shanks inserted into the holes can be rotated.

The shutter mechanism constructed as mentioned above is operated at fairly high speed, and thus the shutter appears to work and stop without any problem. In practice, however, the shutter is operated with complicated movement, as the case may be, and experiences a serious shock when stopped, so that, for example, the blades are temporarily deformed. Consequently, extremely fine wear dust is produced by sliding and abutment due to movements of individual members. Such wear dust may be produced even where one surface slides over another surface as in the blades or the blade and the base plate, but most often where the shank slides along the hole as in a portion connecting the blade to another member.

A typical example of the above description in the focal-plane shutter will be explained below. An ordinary shutter blade group, as mentioned above, is constructed with the arms, blades, and joint shanks. As such, in the operation of the shutter blade group, the fitting portion in which the joint shank is inserted into the hole of the arm is relatively brought into a sliding and contacting state. The impact force exerted by the stop of the shutter considerably influences this fitting portion. Moreover, in the operation of the shutter blade group, the heads of the joint shanks slide over the surface of the base plate. In this operation, not only is the shutter blade group normally actuated, but it is irregularly moved. In particular, since the arms and the blades are deformed at a stop, the phenomenon occurs such that the heads of the joint shanks are struck against the surface of the shutter base plate or the auxiliary base plate. Furthermore, in most cases, the pivotally supported portion of a slit-forming blade is constructed to enter and leave the exposure aperture in the operation of the shutter blade group, and thus when it leaves the exposure aperture, the heads of the joint shanks abut on the edge of the aperture of the shutter base plate or the auxiliary base plate.

This will be explained with reference to a conventional example shown in FIG. 1. In this figure, an aperture Aa is provided at about the middle of a shutter base plate A. Although this conventional example is actually provided with two shutter blade groups, only the second blade group is shown in FIG. 1. Thus, in the conventional example, an intermediate plate B is placed on the back side of the shutter base plate A, and an auxiliary base plate C is also placed on the back side thereof, so that the second blade group is situated in a blade chamber provided between the intermediate plate B and the auxiliary base plate C. Apertures Ba and Ca, similar in shape to the aperture Aa, are provided in the intermediate plate B and the auxiliary base plate C, respectively, and the shape of the exposure aperture (an image frame) is restricted by at least one of these apertures.

The second blade group is constructed with two arms D and E and four blades F, G, H, and I. The arms D and E are rotatably mounted to the shutter base plate A at their left ends, and the blades F, G, H, and I are pivotally supported with respect to the arms D and E through the joint shanks (rivet parts). The pivotally supporting structures of individual blades are the same, and hence only the pivotally supporting structure of the blade I will be described here. A joint shank J is inserted into the holes of the arm D and the blade I from the side of the auxiliary base plate C, and the end of the inserted shank is caulked to the blade I. A joint shank K is also inserted into the holes of the arm E and the blade I from the side of the auxiliary base plate C, and the end of the inserted shank is caulked to the blade I. Consequently, the heads of the joint shanks J and K are situated on the side of the auxiliary base plate C, and the arms D and E and the joint shanks J and K are not fixed. The caulking portions of the joint shanks J and K, not shown in the figure, are such that they do not project into the surface side of the blade I (this side of the paper of FIG. 1) by partially deforming the blade I.

In the structure mentioned above, when the second blade group is actuated, the joint shanks J and K follow arcuate working paths indicated by chain lines in the figure. Since the remaining six joint shanks are also operated at the same angle, their working paths likewise become arcuate. In this operation, the blades F, G, H, and I, in which a mutually overlapping relation is changed, slide along adjacent blades. The blades F, G, H, and I also slide along the intermediate plate B and the auxiliary base plate C. On the other hand, individual joint shanks slide in the holes of the arms D and E, and the outer surfaces of their heads slide over the auxiliary base plate C. In most cases, however, the heads of the foremost joint shanks J and K of the arms D and E abut temporarily on the edge of the aperture Ca or at a portion close thereto in the operation process of the shutter. Hence, such sliding and abutment are responsible for the production of wear dust. It is needless to say that this holds for the case of the first blade group interposed between the shutter base plate A and the intermediate plate B.

The arms and blades mentioned above are ordinarily manufactured in such a way that thin metallic plates with relatively high rigidity are blanked by a press machine. The joint shanks, as the rivet parts, are manufactured by cutting bar stocks of free-cutting steel. Consequently, even when the shutter blade group is constructed with a plurality of blades, the frequency that wear dust is produced by sliding of blades is extremely diminished. In addition, even in the case where the blades slide along plate members constituting the blade chamber, sliding and contact between relatively large surfaces are brought about, and hence the wear dust is rarely produced even though the plate members are made of synthetic resin (the shutter base plate and the auxiliary base plate are sometimes made of synthetic resin).

In the fitting portion in which the joint shank is inserted in the hole of the arm, however, the joint shank may be worn to produce relatively many particles of wear dust. Where the shutter base plate and the auxiliary base plate are metallic, relatively hard metal is used, and thus the heads of the joint shanks may be worn by sliding and abutment relative to them to produce relatively many particles of wear dust. Moreover, when the shutter base plate and the auxiliary base plate are made of synthetic resin, wear dust may be produced from these base plates. The lens shutter, although different in structure, is also provided with fitting portions in which the joint shanks are inserted into the holes and has a plurality of sliding and contact portions. Hence, the lens shutter will produce such wear dust to a greater or less degree.

It is desirable that, even through the wear dust is produced as described above, provision is made for driving the wear dust in a direction different from that of the exposure aperture so that the dust does not reach the imaging surface of a film or a CCD through the exposure aperture. However, such favorable provision is not easily available. In particular, since as mentioned above the joint shanks J and K situated at the foremost ends of the arms D and E are operated inside the exposure aperture, it is extremely difficult that provision is made to prevent wear dust produced by at least the joint shanks J and K from adhering to the surface of the film or the CCD.

If such wear dust adheres, over a preset amount, to the surface of the film or the CCD, a favorable photographing result will not be obtained, and when an image is magnified and reproduced, a part of the image develops a defect. In particular, the digital camera is such that an image sensor is fixed in the camera, and thus when the wear dust adheres directly to the entrance surface of the image sensor or a low-pass filter disposed in front thereof, the influence of the dust is exerted on any subsequent photography and additional particles of wear dust adhere successively to and around the surface. This causes a serious problem.

Thus, in a conventional case, when such a phenomenon is brought about in the camera equipped with the focal-plane shutter, a lens is removed, a mirror is raised up, the shutter blade group is moved from the front of the image sensor (the exposure aperture is brought into a fully opened state), and then wear dust must be eliminated by an air brush. However, this work is by no means easy, and in a camera which is not designed to interchange lenses such as that provided with a zoom lens or a lens shutter, even the above way cannot be adopted. The same holds for provision to eliminate dirt entering a camera from the exterior or produced in the camera, as well as the wear dust. Therefore, the advent of a new shutter for cameras with little influence of the wear dust or dirt is hastened.

On the other hand, in the film camera, even though the wear dust adheres to the film in such a manner as mentioned above, the frame of the film is changed each time photographing is performed and thus the dust merely adheres to each frame. It is impossible that the dust is accumulated and attached as in the digital camera. Hence, the wear dust has little been regarded as a problem. However, since it has been thought of as a problem in the digital camera, a demand has recently been increased for a new shutter in which the above phenomenon is hard to occur even though it has a slight influence on the shutter.

SUMMARY OF THE INVENTION

It is, therefore, a primary object of the present invention to provide a focal-plane shutter for cameras in which it is avoidable that the heads of joint shanks situated at the pivotally supporting portions of the arms and blades of the shutter blade groups abut on the edges of the apertures of the base plates constituting the blade chambers or on portions close thereto to produce wear dust.

It is another object of the present invention to provide a focal-plane shutter for cameras in which wear dust produced by the operations of the shutter blade groups and dirt existing in a camera are hard to reach the imaging surface through the exposure aperture.

It is still another object of the present invention to provide a focal-plane shutter for cameras in which a dimension in the direction of the optical axis in a camera can be reduced.

In order to achieve the above objects, the focal-plane shutter for cameras of the present invention is provided with a single blade chamber between two base plates, each having an aperture for exposure at about the middle thereof, or two blade chambers into which the single blade chamber is partitioned between the two base plates by an intermediate plate having an aperture for exposure at about the middle thereof. A shutter blade group placed in each of the two blade chambers is constructed with a plurality of arms whose ends are pivotally mounted to one of the two base plates at the side of the aperture and at least one blade pivotally supported by the arms through individual joint shanks so that working paths of the joint shanks does not run inside the apertures of the base plates. In addition, a wall is provided on at least one of the two base plates so as to project toward the blade chamber side, between the aperture provided in one of the two base plates and the working region of the arms, along the edge of the aperture. When the wall has an inclined face directed toward the aperture of an opposite base plate, light reflected by the wall becomes hard to reach the imaging surface. In this case, when the inclined face is configured and thereby the dimension of the end face of the aperture in a direction parallel with the optical axis is made smaller than the thickness of the base plate provided with the inclined face, the effect of the present invention is further heightened.

In the focal-plane shutter for cameras of the present invention, when the wall is provided to extend to the outer edge of the base plate, the wear dust becomes hard to reach the imaging surface.

In the focal-plane shutter for cameras of the present invention, when the wall is integrally molded out of synthetic resin or is configured through the knockout process and press process of a metallic plate, fabrication is facilitated.

In the focal-plane shutter for cameras of the present invention, when the intermediate plate is mounted to partition the single blade chamber between the two base plates so that it is not moved relative to the two base plates, the function of the wall is more effective than in the case where it is moved.

In the focal-plane shutter for cameras of the present invention, when the shutter blade group has a plurality of blades and the wall provided on the side of the blade chamber of the shutter blade group is configured so that the amount of projection is increased in the direction in which the blades of the shutter blade group are spread, the wear dust becomes hard to reach the imaging surface even when the shutter is downsized.

In the focal-plane shutter for cameras of the present invention, when adhesive substances are applied to or stuck on faces of the wall located on the side of the working region of the arms, the wear dust adheres thereto so that it is not scattered. In this case, when the adhesive substances are also used as antireflection substances, this is advantageous for light-leakage prevention.

In the focal-plane shutter for cameras of the present invention, when the base plate placed on the imaging surface side has a concavity for receiving a part of a lowpass filter or image sensor so as to surround the aperture on the imaging surface side, this offers the advantageous of reducing the thickness of a digital camera.

The focal-plane shutter for cameras of the present invention is provided with a blade chamber between two base plates, each having an aperture for exposure, to place a shutter blade group in the blade chamber, or two blade chambers into which the blade chamber is partitioned between the two base plates to place a different shutter blade group in each of the two blade chambers. In this case, at least one of the two base plates is provided with adhesive means on surfaces with which the shutter blade group has no contact to operate.

In the focal-plane shutter for cameras of the present invention, when the adhesive means are provided in troughs configured on at least one of the two base plates, the adhesive means can be easily placed in the working region of the shutter blade group when the troughs are configured in the blade chamber. Moreover, when they are configured outside the blade chamber, accessibility of the adhesive means is reduced, and thus this is advantageous for handling of the shutter.

In the focal-plane shutter for cameras of the present invention, when a frame is configured so as to surround the aperture, outside the blade chamber, on at least one of the two base plates and is provided with the adhesive means, wear dust or dirt scattered from the interior of the blade chamber toward the object side is easily captured and the amount of dust which reaches again the interior of the shutter can be reduced.

In the focal-plane shutter for cameras of the present invention, when at least one of the two base plates has a wall extending from the aperture to its peripheral ends on the blade chamber side and is provided with the adhesive means on at least one of a surface on the blade chamber side and a face of the wall which is not parallel with the surface, wear dust or dirt is easily captured effectively and becomes hard to reach the aperture side.

In the focal-plane shutter for cameras in this case, the shutter blade group has a plurality of arms rotatably mounted to one of the two base plates and at least one blade pivotally supported by the arms, and the wall is interposed between the working region of the arms and the aperture. By doing so, the structure becomes entirely favorable for the focal-plane shutter.

In the focal-plane shutter for cameras, when the adhesive means has an antireflection function, this is advantageous for light-leakage prevention.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 5 is a plan view showing an auxiliary base plate used in the first embodiment;

DETAILED DESCRIPTION OF THE PREFERRED EMBODIMENTS

Figure 1:
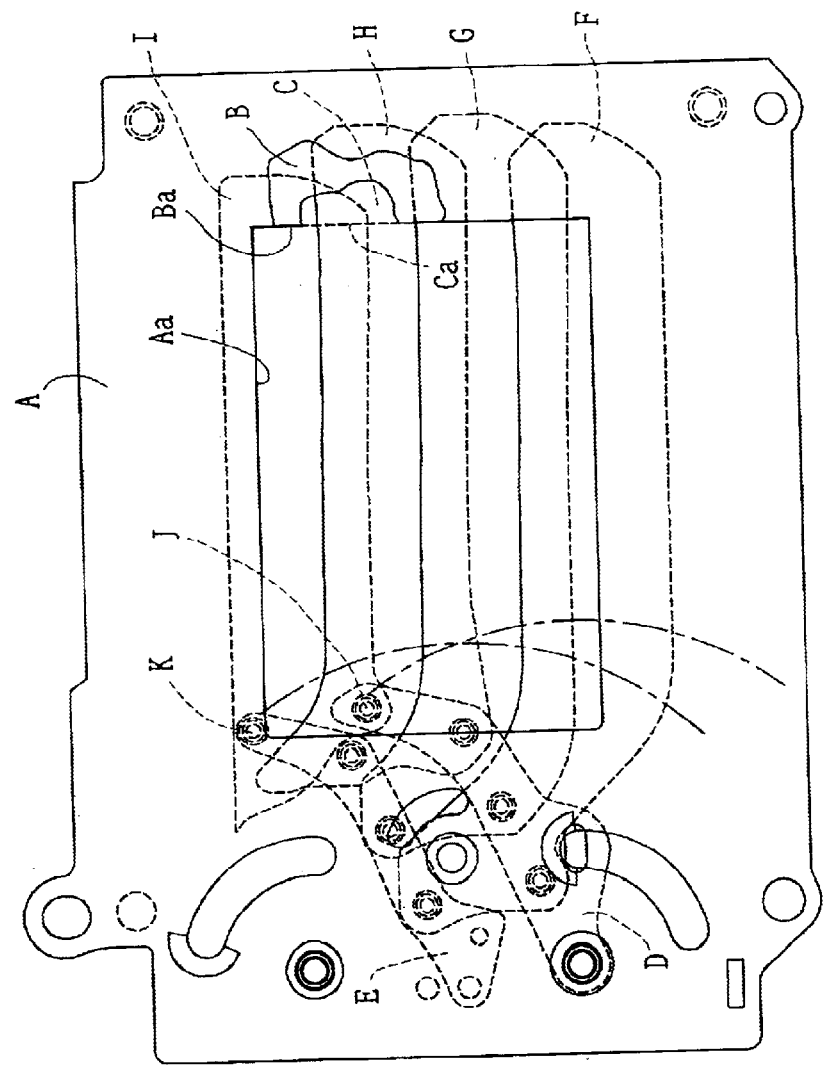
FIG. 1 is a plan view for explaining a conventional example of a focal-plane shutter viewed from the object side.

In accordance with the embodiments shown in the drawings, the present invention will be explained below. Any of the embodiments is constructed as a focal-plane shutter for digital cameras. In the embodiments, like numerals indicate like members to avoid unnecessary duplication of description. In the figures of the embodiments, the first blade group and the second blade group are depicted, but for driving members for driving these blade groups, cocking members for cocking the driving members after photography, and electromagnets for controlling the start of the exposure operation of the driving members, well-known parts are applied and are omitted from the figures because they have no direct bearing upon the comprehension of the present invention.

First Embodiment

Figure 2:
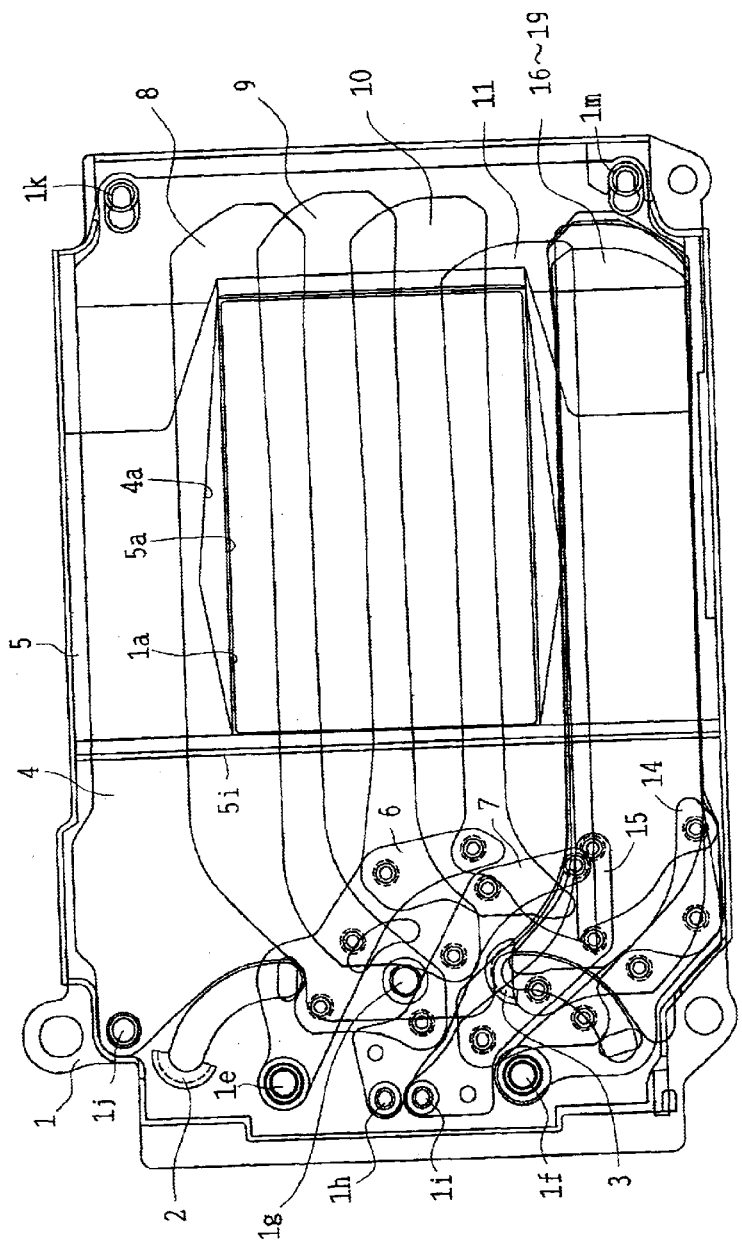
FIG. 2 is a perspective view showing a focal-plane shutter in a first embodiment of the present invention, viewed form the object side, that is, the photographic lens side, immediately before an exposure operation is started.
Figure 3:
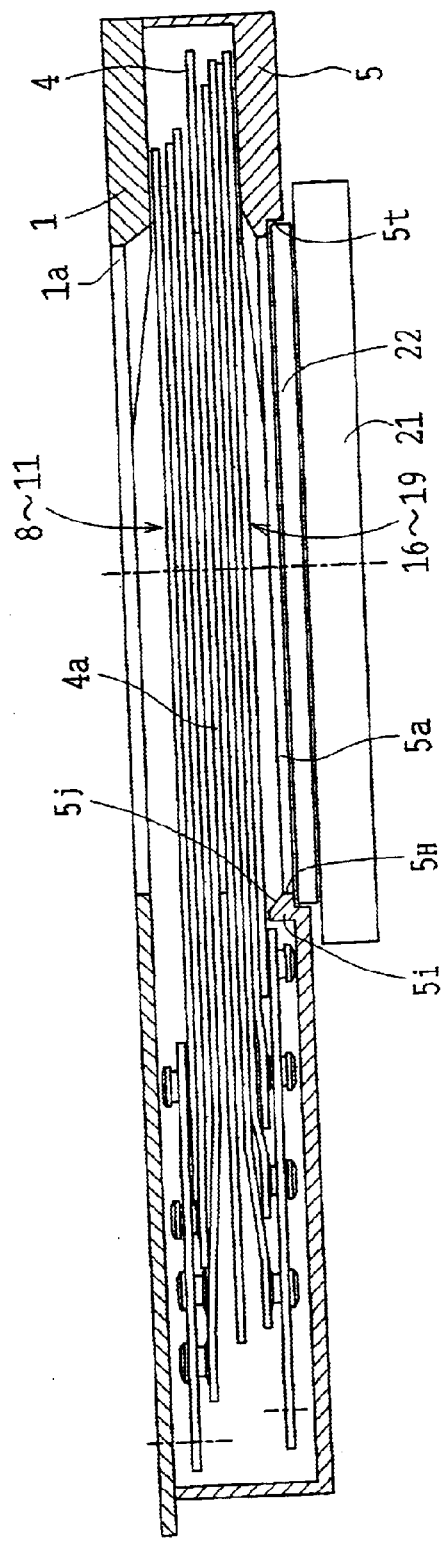
FIG. 3 is a sectional view showing essential parts placed in blade chambers in the first embodiment.
Figure 4A:
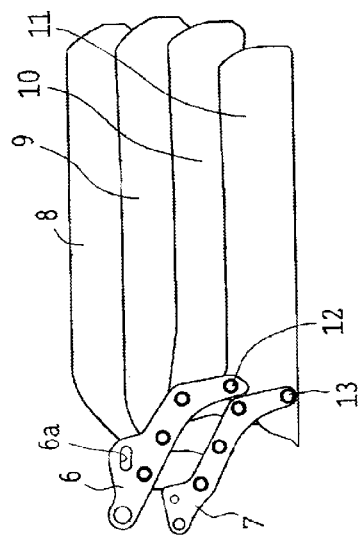
FIG. 4A is a plan view showing a shutter base plate in FIG. 2.

The first embodiment of the present invention is described with reference to FIGS. 1–7. The structure of the first embodiment is first explained. In this explanation, it is assumed that, in a state where the shutter is mounted to a camera, the object side is referred to as a surface side and the image sensor side as a back side. In FIG. 2, a shutter base plate 1 placed at the most object-side position is made of synthetic resin, and as shown in FIG. 4A, is provided with an aperture 1a for exposure at about the middle and three arcuate slots 1b, 1c, and 1d on the left side of the aperture. At the upper ends of the slots 1b and 1c, shock absorbing members 2 and 3 made of butyl rubber, each having a planar shape like a letter C, are mounted in a well-known fashion.

Furthermore, shanks 1e, 1f, and 1g are set upright on the surface side of the shutter base plate 1, and the shanks 1e and 1f project on the back side as well, so that the arms of the first blade group and the second blade group which will be described later are pivotally (rotatably) mounted to these shanks. On the surface side of the shutter base plate 1, well-known driving members for the first blade group and the second blade group, which are not shown in the figure, are rotatably mounted to the shanks 1e and 1f, and driving pins provided in these driving members pass through the slots 1b and 1c to project on the back side. When the exposure operation is completed, the driving pins abut on the shock absorbing members 2 and 3 and the driving members are stopped. Moreover, a well-known cocking member, not shown, is rotatably mounted to the shank 1g, and when cocked, it is rotated from the initial position so that the driving members are rotated to cocking positions against biasing forces of their driving springs, while when restored to the initial position, it is stopped in such a way that a pin, not shown, abuts on one end of the slot 1d.

On the back side of the shutter base plate 1, shanks 1h, 1i, 1j, 1k, and 1m are set upright. Of these, the shanks 1h and 1i are provided for the purpose of pivotally mounting the arms of the first blade group and the second blade group which will be described later, and the remaining shanks 1j, 1k, and 1m are provided for the purpose of mounting an intermediate plate and an auxiliary base plate which will be described later. In addition, holes 1N, 1P, and 1Q are provided in the shutter base plate 1 for the purpose of mounting the shutter to a camera body.

Subsequently, a description will be given of members to be mounted on the back side of the shutter base plate 1 and a structure for mounting the members. The entire structure on the back side is first outlined. On the back side of the shutter base plate 1, an intermediate plate 4 (see FIG. 4C) and an auxiliary base plate 5 (see FIG. 5) are mounted at given distances from one another so that the blade chamber of the first blade group (see FIG. 4B) is provided between the shutter base plate 1 and the intermediate plate 4, and the blade chamber of the second blade group (see FIG. 4D) is provided between the intermediate plate 4 and the auxiliary base plate 5. The intermediate plate 4 and the auxiliary base plate 5 are also provided with apertures 4a and 5a, respectively, at about the middles. Usually, the aperture 1a of the shutter base plate 1 is superposed on the apertures 4a and 5a, and thereby a laterally rectangular exposure aperture is synthesized. The first embodiment, however, is such that the exposure aperture is restricted by only the aperture 1a.

Figure 4B:
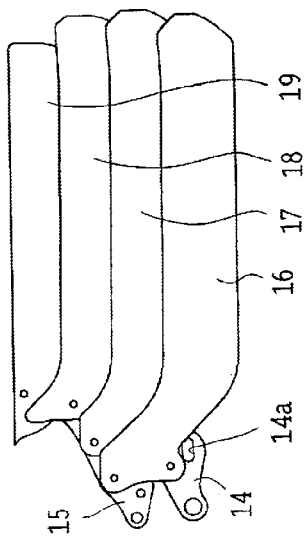
FIG. 4B is a plan view showing a first blade group in FIG. 2.

Here, reference is made to the first blade group shown in FIG. 4B. The first blade group of the first embodiment is constructed with two arms 6 and 7 and four blades 8, 9, 10, and 11 which are pivotally supported in turn in the longitudinal direction of the arms, and the blade 11 pivotally supported at the foremost end is a slit-forming blade. The arm 6 is pivotally mounted by fitting the shank 1e projecting on the back side of the shutter base plate 1 into a hole provided at the left end, and the driving pin of the driving member for the first blade group, not shown, is fitted into a slot 6a. Similarly, the arm 7 is pivotally mounted by fitting the shank 1h of the shutter base plate 1 into a hole provided at the left end.

As is generally known, each of the blades corresponding to the arms 6 and 7 is pivotally supported by using joint shanks as rivet parts, and this pivotally supporting structure is the same in any blade. Thus, in FIG. 4B, only joint shanks used in the slit-forming blade 11 are labeled 12 and 13. In the case of the pivotally supporting structure in which the joint shank 12 is used, for example, the holes provided in the arm 6 and the blade 11 are superposed and the joint shank 12 is inserted into the holes from the side of the arm 6 to caulk the end of the inserted shank to the blade 11, but the arm 6 and the joint shank 12 are not fixed. Thus, in the first blade group, all the heads of eight joint shanks project from the surfaces of the arms 6 and 7 on the side of the shutter base plate 1 so that they slide along the shutter base plate 1.

Figure 4C:
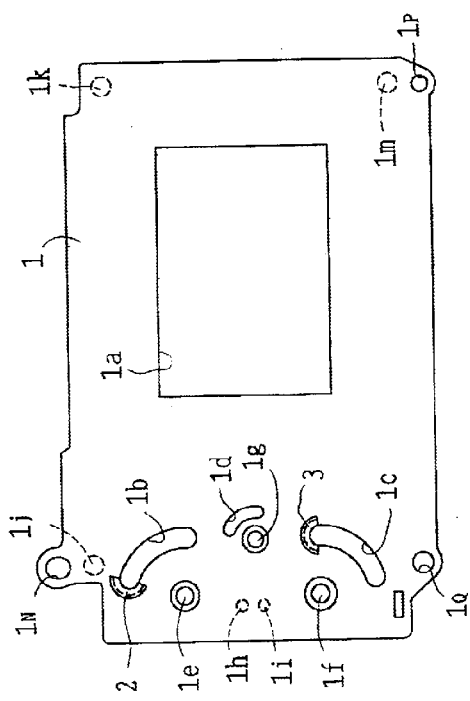
FIG. 4C is a plan view showing an intermediate plate in FIG. 2.

Subsequently, reference is made to the intermediate plate 4 in accordance with FIG. 4C. As mentioned above, the blade chamber of the first blade group is provided between the shutter base plate 1 and the intermediate plate 4, and the aperture 4a is configured at about the middle of the intermediate plate 4. The aperture 4a is different in shape from the aperture 1a of the shutter base plate 1, but the reason for this is well known and thus the explanation is omitted. In the first embodiment, the aperture 4a is provided so that its left edge practically overlaps that of the aperture 1a. The intermediate plate 4 is mounted by fitting the shanks 1j, 1k, and 1m of the shutter base plate 1 into holes 4b, 4c, and 4d, respectively. The intermediate plate 4 in the first embodiment, however, is mounted so that it is not moved in the axial direction of the shanks 1j, 1k, and 1m by a means, not shown, in their fitting portions.

Figure 4D:
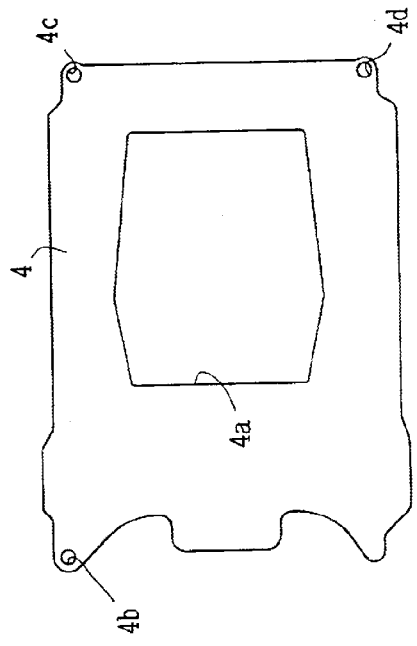
FIG. 4D is a plan view showing a second blade group in FIG. 2.

On the back side of the intermediate plate 4, the second blade group illustrated in FIG. 4D is placed. The second blade group, whose blades are arranged in such a way that the blades of the first blade group are turned upside down, includes two arms 14 and 15 and four blades 16, 17, 18, and 19 which are pivotally supported in turn in the longitudinal direction of the arms, and the blade 19 pivotally supported at the foremost end is a slit-forming blade. The arm 14 is pivotally mounted by fitting the shank 1f projecting on the back side of the shutter base plate 1 into a hole provided at the left end, and the driving pin of the driving member for the second blade group, not shown, is fitted into a slot 14a. Similarly, the arm 15 is pivotally mounted by fitting the shank 1i of the shutter base plate 1 into a hole provided at the left end.

The pivotally supporting structure of each of the blades 16, 17, 18, and 19 corresponding to the arms 14 and 15 is the same as the case of the first blade group. Therefore, in the second blade group, the arms 14 and 15 are placed on the side of the auxiliary plate 5 of the blades 16, 17, 18, and 19, and thus all the heads of eight joint shanks project from the surfaces of the arms 14 and 15 on the side of the auxiliary base plate 5 so that they slide along the auxiliary base plate 5. In FIG. 2, the second blade group is such that the blades 16, 17, 18, and 19 overlap one another and are housed in the lower portion of the aperture 1a, but in FIG. 4D, to facilitate a comprehension of the blade structure, the blades are shown in a spreading condition.

In FIG. 5, the auxiliary base plate 5 is depicted which constitutes the blade chamber of the second blade group, together with the intermediate plate 4. The auxiliary base plate 5 is constructed of synthetic resin and is provided with the aperture 5a, already mentioned, at about the middle. Although the aperture 5a has a shape somewhat larger than the aperture 1a of the shutter base plate 1, it is placed so that the left edge practically overlaps those of the apertures 1a and 4a. On the left side of the aperture 5a, four holes are provided for the purpose of receiving the tops of the four shanks 1e, 1f, 1h, and 1i which are set upright on the shutter base plate 1. In addition, holes 5b, 5c, and 5d are provided at three corners of the auxiliary base plate 5 for the purpose of mounting the auxiliary base plate 5 to the shanks 1j, 1k, and 1m of the shutter base plate 1, and its specific mounting technique will be described later.

A light-blocking wall 5e is configured on the auxiliary base plate 5 so as to surround the majority portion of its periphery, for the purpose of cutting off ambient light entering the blade chambers. Moreover, the auxiliary base plate 5 is configured with a wall 5i extending along the left edge of the aperture 5a and to the upper and lower edges of the auxiliary base plate 5. The wall 5i, as seen from FIG. 3, has an inclined face 5j directed toward the object side and the side of the aperture 1a, and thereby the dimension of an end face 5H of the aperture 5a in a direction parallel with the optical axis is made smaller than the thickness of the auxiliary base plate 5. In the first embodiment, this wall 5i is configured through an integral molding process of synthetic resin, but when the auxiliary base plate 5, made of metal, is configured through a knockout process and a press process, this is advantageous for cost. On the back side of this auxiliary base plate 5, as seen from FIGS. 3 and 6, a concavity 5t is configured so as to surround the aperture 5a.

Figure 6:
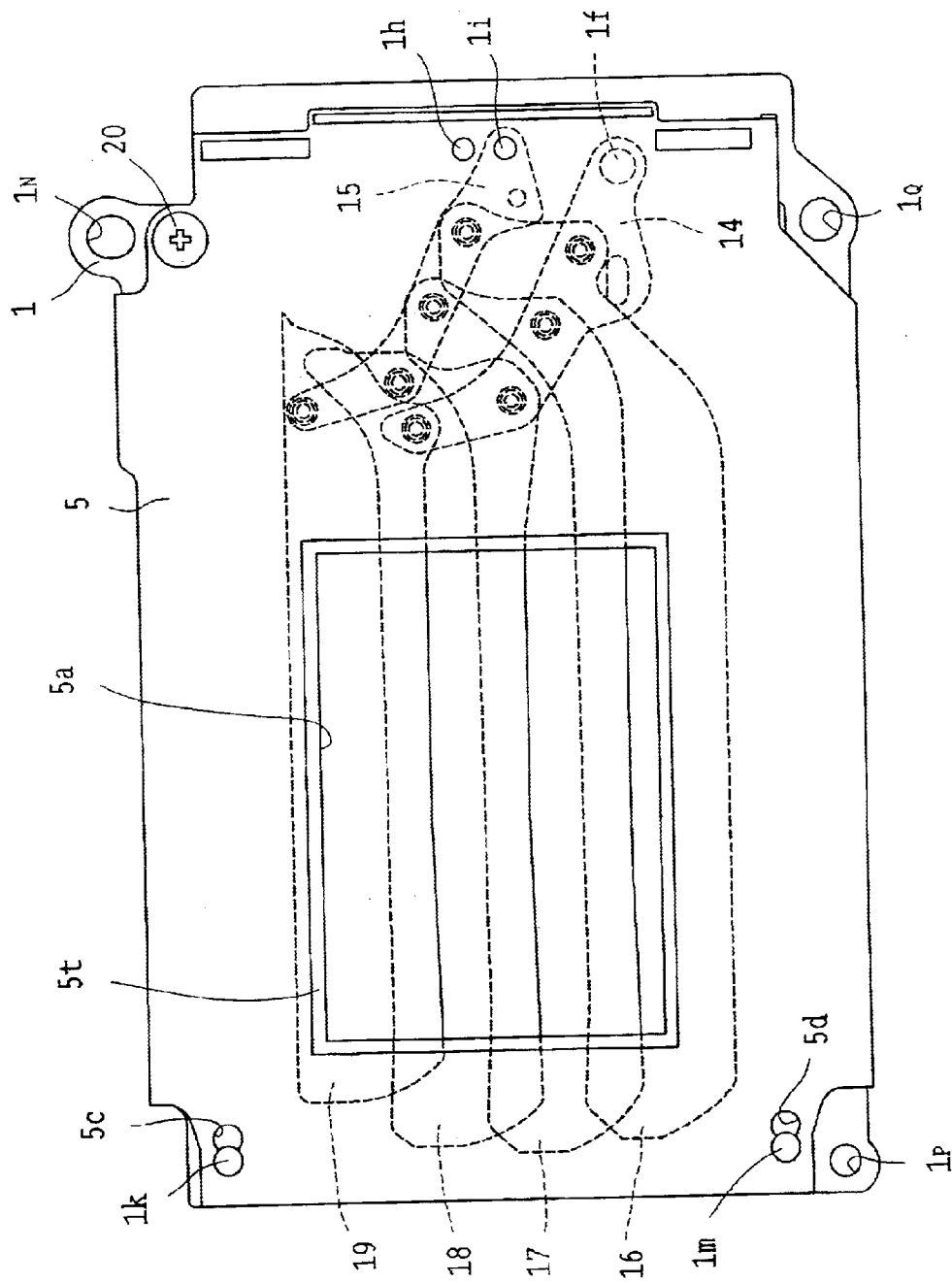
FIG. 6 is a plan view showing the focal-plane shutter in the first embodiment, viewed from the image sensor side, immediately after the exposure operation of the second blade group is completed.

Subsequently, the mounting technique of the auxiliary base plate 5, which has been known from the past, is briefly explained. A screw hole is provided at the top of the shank 1j of the shutter base plate 1, and annular grooves are configured on the peripheries of the tops of the shanks 1k and 1m. Each of the holes 5c and 5d of the auxiliary base plate 5 has such a shape that a keyhole is laterally placed. In FIG. 5, the shanks 1k and 1m are first fitted into large openings on the left side of the holes 5c and 5d, respectively, and then the auxiliary base plate 5 is moved to the left so that edges of smaller openings on the right side are set in the annular grooves. In this state, a screw 20 shown in FIG. 6 is inserted into the hole 5b and is threaded into the screw hole of the shank 1j.

The shutter unit of the first embodiment is constructed as mentioned above, and this shutter is the focal-plane shutter for digital cameras. An image sensor is thus placed on the back side of the auxiliary base plate 5. In the first embodiment, as shown in FIG. 3, a CCD 21 is used as the image sensor, and a low-pass filter 22 is disposed in front thereof. The concavity 5t of the auxiliary base plate 5 described above is provided for the purpose of receiving the low-pass filter 22. This affords space saving of a camera along the optical axis and as a result, allows the thickness of the camera to be reduced. Also, although in the first embodiment the CCD 21 and the low-pass filter 22 are separately placed, they may be integrally constructed or the low-pass filter 22 may be eliminated. Thus, in the latter case, the concavity 5t receives the CCD 21.

Next, the operation of the first embodiment will be described. In FIG. 2, the cocking condition of the shutter is shown. In this case, the well-known driving members, not shown, for the first and second blade groups are rotated clockwise by the cocking member, not shown, rotated from the initial position, against the biasing forces of individual driving springs. Consequently, by the driving pins provided in the driving members, the arm 6 for the first blade group and the arm 14 for the second blade group are rotated clockwise so that the four blades 8, 9, 10, and 11 of the first blade group are brought into a spreading condition to cover the aperture 1a, while the four blades 16, 17, 18, and 19 are in an overlapping condition and are housed in the lower portion of the aperture 1a.

In such a cocking condition, when the release button of the camera is pressed, electromagnets, not shown, for the first and second blade groups are first energized, and when the driving members for the first and second blade groups are attracted and retained by the electromagnets, the cocking member is restored to the initial position. Next, when power to the electromagnet for the first blade group is disconnected, a retaining force due to the electromagnet is lost and the driving member for the first blade group is rotated counterclockwise by the biasing force of the driving spring for the first blade group. Hence, the driving pin of the driving member for the first blade group rotates the arm 6 counterclockwise to move upward the four blades 8, 9, 10, and 11 of the first blade group. Consequently, the amount of mutual overlapping of the blades is increased and the aperture 1a is gradually opened by a slit-forming edge which is provided on the lower side of the slit-forming blade 11. At a stage in which the aperture 1a is fully opened by the slit-forming edge of the slit-forming blade 11, the driving pin of the driving member for the first blade group abuts on the shock absorbing member 2 to stop the movements of the driving member for the first blade group and the first blade group.

In the first embodiment, during the above operation, the tops of the arms 6 and 7 do not pass the area of the aperture 1a, and thus the joint shanks 12 and 13 also do not pass the area of the aperture 1a, as a matter of course. As such, since the heads of the joint shanks 12 and 13 do not abut on the face of the edge of the aperture 1a or on the surface of the shutter base plate 1 on the blade chamber side at a portion close thereto, it is avoidable that wear dust is produced by such abutment as in the conventional shutter. In this operation, wear dust is sometimes produced between the arms 6 and 7 and the eight joint shanks and between the heads of the eight joint shanks and the surface of the shutter base plate 1 on the blade chamber side. This wear dust, however, is produced on the left side of the aperture 1a and the object side of the blades 8, 9, 10, and 11, and hence the amount of dust reaching the surface of the low-pass filter 22 is smaller than in the second blade group to be described later.

When a preset time passes after power to the electromagnet for the first blade group is disconnected as mentioned above, power to the electromagnet for the second blade group is now disconnected. As is well known, timing where power to the electromagnet for the second blade group is disconnected is various, depending on the photographing condition, and actually the power is often disconnected before the exposure operation of the first blade group is completed. In the operation of the first embodiment, however, for convenience, the following description is given in the case where the power is disconnected after the exposure operation of the first blade group is completed, as stated above.

Figure 7:
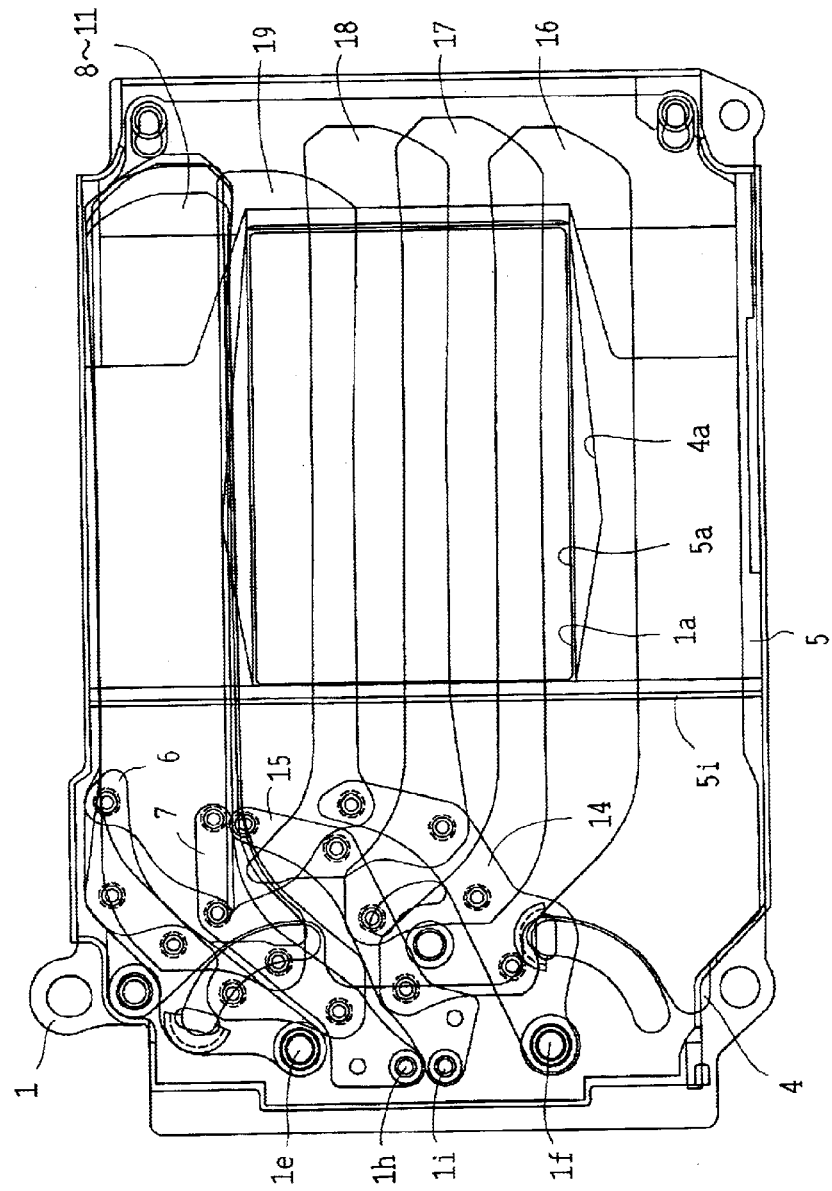
FIG. 7 is a perspective view showing the focal-plane shutter in the first embodiment, viewed from the object side, immediately after the exposure operation is completed.

When power to the electromagnet for the second blade group is disconnected, the driving member for the second blade group is rotated counterclockwise by the biasing force of the driving spring for the second blade group. As a result, the driving pin of the driving member for the second blade group rotates the arm 14 counterclockwise to move upward the four blades 16, 17, 18, and 19 of the second blade group. Hence, the amount of mutual overlapping of the blades is reduced and the aperture 1a is gradually closed by a slit-forming edge which is provided on the upper side of the slit-forming blade 19. At a stage in which the aperture 1a is closed by the slit-forming edge of the slit-forming blade 19, the driving pin of the driving member for the second blade group abuts on the shock absorbing member 3 to stop the movements of the driving member for the second blade group and the second blade group. This stop condition is shown in FIGS. 6 and 7.

In this exposure operation of the second blade group, the operations of the arms 14 and 15 are performed on the left side of the wall 5i configured on the auxiliary base plate 5. The tops of these arms do not pass the area of the aperture 5a, and thus two joint shanks used in the pivotally supporting structure of the slit-forming blade also do not pass the area of the aperture 5a, as a matter of course. As such, since the heads of the joint shanks do not abut on the face of the edge of the aperture 5a or on the surface of the auxiliary base plate 5 on the blade chamber side at a portion close thereto, it is avoidable that wear dust is produced by such abutment as in the conventional shutter.

In this operation, wear dust is sometimes produced between the arms 14 and 15 and the eight joint shanks and between the heads of the eight joint shanks and the surface of the auxiliary base plate 5 on the blade chamber side. In this case, however, most of particles of wear dust are blocked by the wall 5i and the amount of dust reaching the surface of the low-pass filter 22 is slight. As seen from this, the wall 5i is provided for the purpose of preventing the wear dust from advancing toward the low-pass filter 22, and thus, originally, the wall 5i may be configured only at the edge of the aperture 5a. In the first embodiment, however, the wall 5i is extended to the outer edge of the auxiliary base plate 5 in order to check more effectively the advance of the dust.

The height of the wall 5i (the dimension of a projection on the blade chamber side) in the first embodiment is uniform. The intermediate plate 4 and the auxiliary base plate 5, although partially different from each other, are mutually fixed so that an even gap between them is obtained as a whole. The gap is determined in consideration of the thickness of the four blades 16, 17, 18, and 19 of the second blade group which are in an overlapping condition, the thicknesses of the arms 14 and 15, and the height of each joint shank (the dimension of a projection on the side of the auxiliary base plate 5). As such, in the overlapping condition, the slit-forming blade 19 is nearly in contact with the wall 5i.

However, when the blades 16, 17, 18, and 19 are in the spreading condition, the gap corresponding to the thickness of two adjacent blades is enough. In theory, when the slit-forming blade 19 is moved to the side of the intermediate plate 4, a clearance between the slit-forming blade 19 and the wall 5i is much larger than in the overlapping condition. This clearance increases gradually in changing from the overlapping condition to the spreading condition. Hence, in order to prevent the wear dust from reaching the low-pass filter 22 through the clearance, it is only necessary to progressively increase the height of the wall 5i in going to the upper side in FIG. 5.

The intermediate plate 4, designed so that it is not fixed to the shanks 1j, 1k, and 1m of the shutter base plate 1, has been known from the past. The reason for this is well known and thus the explanation is omitted. In this case also, when the wall 5i is provided as in the first embodiment, it is possible to prevent the wear dust from reaching the low-pass filter 22. However, when the intermediate plate 4 is not fixed as mentioned above, individual shanks are irregularly moved in the axial direction during the operations of the first and second blade groups, and thus there is the fear that the clearance between the slit-forming blade 19 and the wall 5i increases instantaneously. In addition, by the movement of the shanks, the wear dust may be raised. Thus, from only the viewpoint of preventing the wear dust from reaching the low-pass filter 22, it is desirable that the intermediate plate 4, as in the first embodiment, is fixed, irrespective of the number of blades.

Furthermore, in the first embodiment, the wall 5i is configured with the inclined face 5j, and the dimension of the end face 5H, extending therefrom, of the aperture 5a along the optical axis is made smaller than the thickness of the auxiliary plate 5. The reason for this is explained below. In the first embodiment, in order to reduce a lateral dimension of the shutter as far as possible, the face of the wall 5i on the side of the aperture 5a is also used as the end face of the aperture 5a. Consequently, if the wall 5i is configured into a simple shape, the area of the end face will be increased and the amount of light reflected by the end face in photography and incident on the periphery of the CCD 21 through the low-pass filter 21 will be increased. The first embodiment, however, is designed so that most of the light is reflected toward the object side by the inclined face 5j.

It is known that even when the exposure aperture is closed, the reflection of light is repeated in a slight clearance between the components of the shutter, and extremely faint light travels to the back side of the shutter blade group. If a camera is therefore left in such a state for a long period of time, faint light is accumulated to degrade the performance of the image sensor, for instance. Where the shutter is applied to a film camera, a film is exposed to the light and the next photography may result in failure. It is thus necessary that even the extremely faint light mentioned above is reflected as copiously as possible and light reaching the imaging surface is attenuated as far as possible. In the first embodiment, this can be realized by reducing the area of the end face 5H and configuring the inclined face 5j. However, the wall 5i in the present invention is not limited to such a shape, and it may have a simple shape and may be configured at some distance away from the edge of the aperture 5a.

Subsequently, the cocking operation of the shutter will be explained. When the cocking member, not shown, begins to rotate, the driving member for the first blade group is first rotated clockwise against the biasing force of the driving spring for the first blade group. Whereby, the arm 6 is rotated clockwise by the driving pin of the driving member for the first blade group, and thus the blades 8, 9, 10, and 11 of the first blade group are moved downward while reducing the amount of mutual overlapping. At the stage in which the amount of overlapping of the slit-forming blade 11 of the first blade group and the slit-forming blade 19 of the second blade group reaches a predetermined value, the cocking member starts to rotate the driving member for the second blade group in a clockwise direction against the biasing force of the driving spring for the second blade group. As a result, since the arm 14 is rotated clockwise by the driving pin for the second blade group, the blades 16, 17, 18, and 19 of the second blade group are moved downward while increasing the amount of mutual overlapping. When the blades 8, 9, 10, and 11 of the first blade group are spread to cover the aperture 1a and the blades 16, 17, 18, and 19 of the second blade group are overlapped and housed in the lower portion of the aperture 1a, the rotation of the cocking member is stopped and brought into the cocking condition shown in FIG. 2.

Second Embodiment

Figure 8:
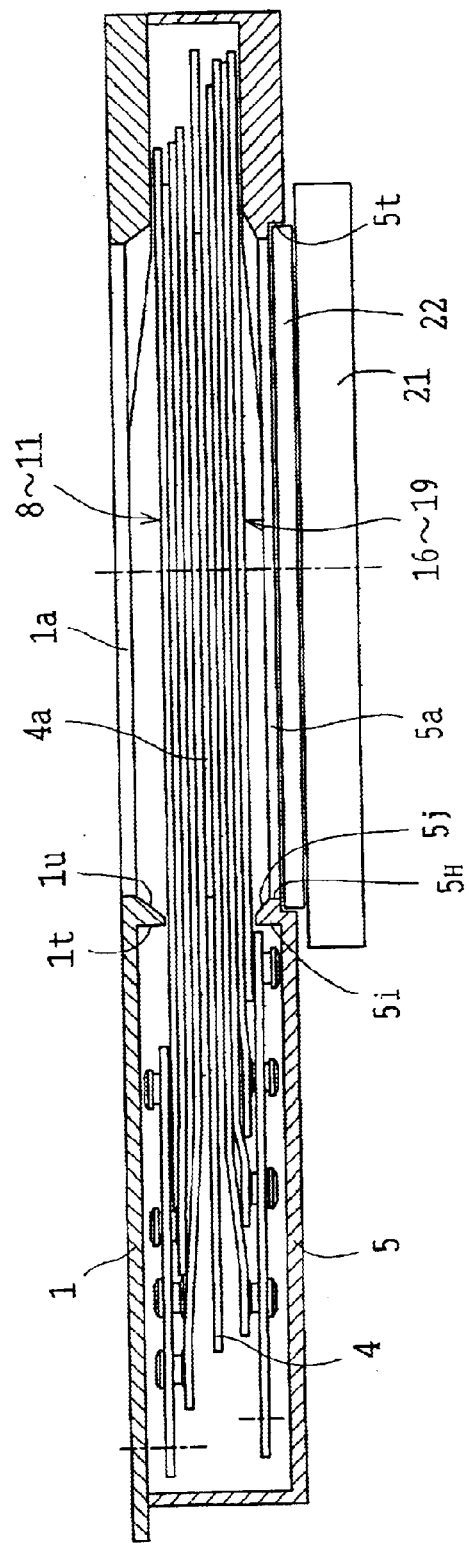
FIG. 8 is a sectional view showing essential parts placed in blade chambers in a second embodiment of the present invention.

The second embodiment of the present invention is explained with reference to FIG. 8. FIG. 8 is the sectional view shown like FIG. 3, and as seen from this figure, the second embodiment has the same structure as the first embodiment with the exception that a wall 1t is configured on the shutter base plate 1. The wall 1t also has an inclined face 1u directed toward the sides of the imaging surface and the aperture 5a and extends to the outer edge of the shutter base plate 1. However, the wall it may be configured only at the edge of the aperture 1a. This is the same as in the case of the wall 5i in the first embodiment.

According to the second embodiment, in this way, the amount of wear dust reaching the low-pass filter 22 from the blade chamber of the first blade group, as well as from the blade chamber of the second blade group, can be reduced. This is more effective than in the first embodiment. Also, although in the second embodiment the inclined face 1u is directed toward the low-pass filter 22, light reflected by this face will not travel to the low-pass filter 22. In the second embodiment, the walls 1t and 5i are provided on the shutter base plate 1 and the auxiliary base plate 5, respectively, but even though only the wall 1t is provided, as the case may be, a desired effect can be brought about. The description of the first embodiment also holds for the case of the second embodiment.

Third Embodiment

Figure 9:
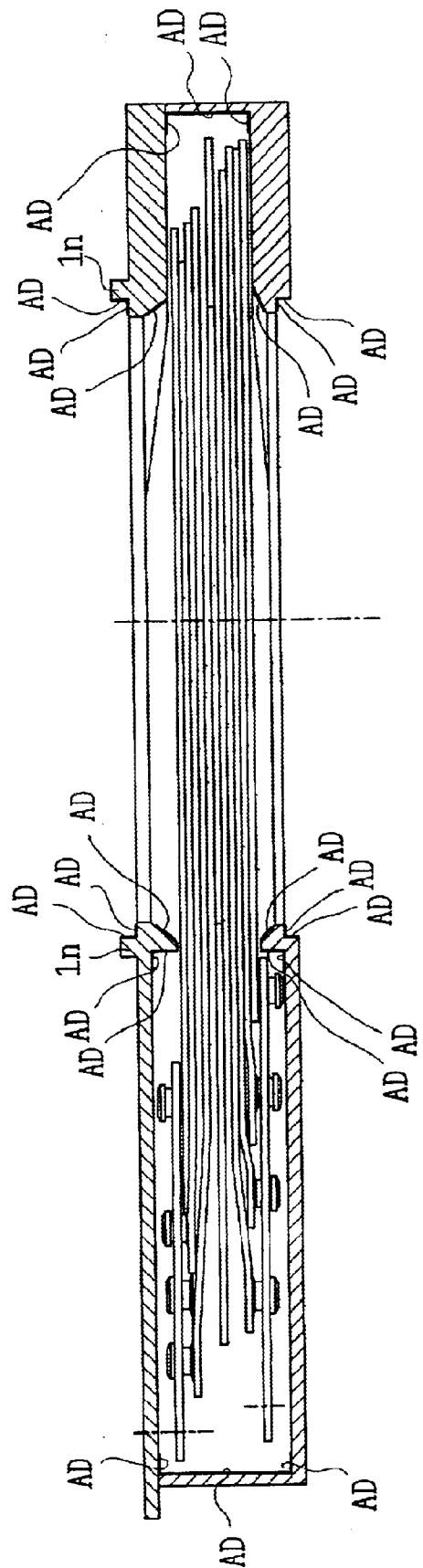
FIG. 9 is sectional view showing essential parts placed in blade chambers in a third embodiment of the present invention.

The third embodiment of the present invention is explained with reference to FIG. 9. FIG. 9 is the sectional view shown like FIG. 8, and as seen from this figure, the third embodiment is configured with a frame 1n in such a way that the entire periphery of the aperture 1a of the shutter base plate 1 is surrounded. An infinite number of adhesive substances AD are applied to or stuck on the shutter base plate 1 and the auxiliary base plate 5. The adhesive substances AD also function as antireflection substances. In FIG. 9, components other than the frame 1n and the adhesive substances AD are not labeled, because they are identical with those of FIG. 8, and the configuration of FIG. 9, not partially shown, is the same as in the first embodiment.

According to the third embodiment, as mentioned above, wear dust produced in the blade chambers adheres to the adhesive substances AD provided on the surfaces of the blade chambers so that the operations of the first and second blade groups are not affected. Consequently, the amount of wear dust reaching the sides of the apertures 1a and 5a is materially reduced in cooperation with the functions of the wall 1t and 5i. Some of particles of the wear dust reaching the sides of the apertures 1a and 5a adhere to the adhesive substances AD provided on the peripheries of the apertures 1a and 5a, and therefore the amount of wear dust reaching the low-pass filter 22 is severely restricted so that photography is not affected. Since the adhesive substances AD in the third embodiment are also used as the antireflection substances, it is also possible to restrain light reflected by the shutter base plate 1 and the auxiliary base plate 5 in photography and incident on the low-pass filter 22 and to extremely restrain light leakage in the imaging surface where the camera is not used. The description of the first and second embodiments also holds for the case of the third embodiment.

In the embodiments mentioned above, reference has been made to the case of use in digital cameras, but the present invention is applied to the film camera. Where the present invention is used in the digital camera, the shutter may be constructed so that a single shutter blade group is used to provide a single blade chamber between the shutter base plate and the auxiliary base plate. Also, although in each of the above embodiments each of the shutter blade groups includes four blades, the number of blades is not limited, and five blades, not to speak of a single blade, may be used. In each of the above embodiments, the shutter blade group is actuated by the driving spring, but a shutter blade group actuated by an electromagnetic driving means is also applied to the present invention.

In the present invention, as stated above, the joint shanks interposed between the arms of the shutter blade group and the blades fail to enter and leave the exposure aperture during the operation of the shutter. It is thus avoidable that the joint shanks abut on the edge of the exposure aperture provided in the base plate or a portion close thereto to produce wear dust. Furthermore, the base plate is provided with the wall between the working region of the arms and the exposure aperture, and thereby wear dust produced by the operations of the shutter blade groups can be made hard to leave the blade chambers. As such, the amount of wear dust adhering to the imaging surface can be minimized.

Fourth Embodiment

Figure 11:
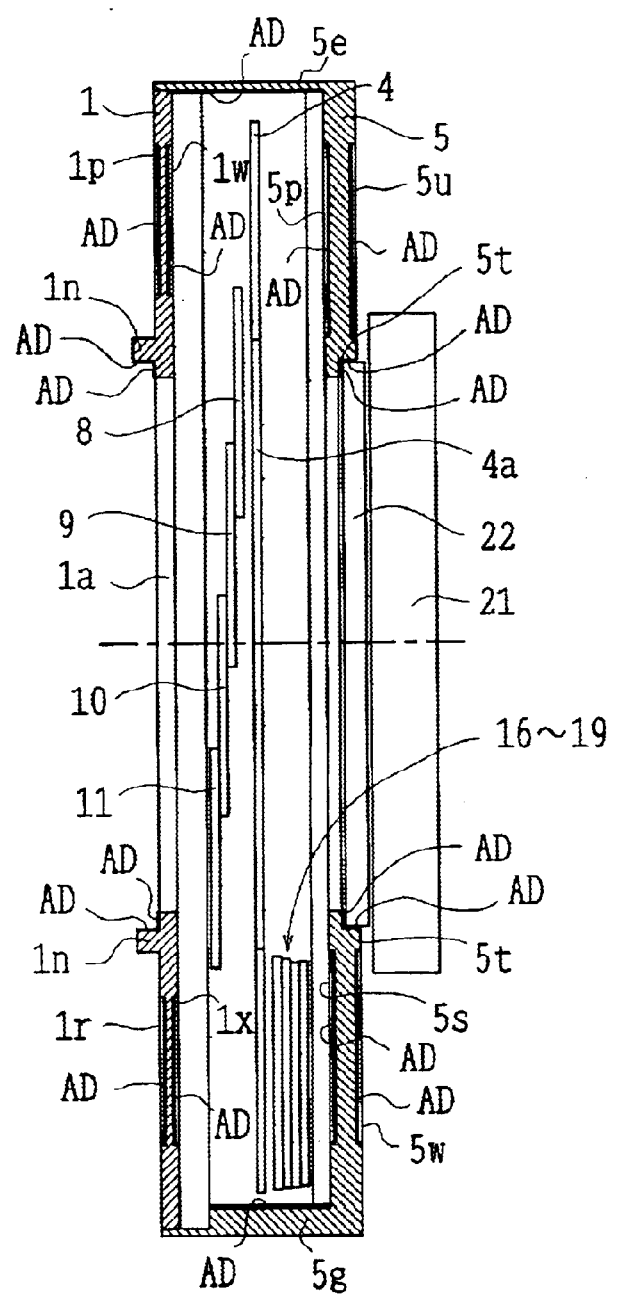
FIG. 11 is a sectional view taken along line A—A in FIG. 10.
Figure 12:
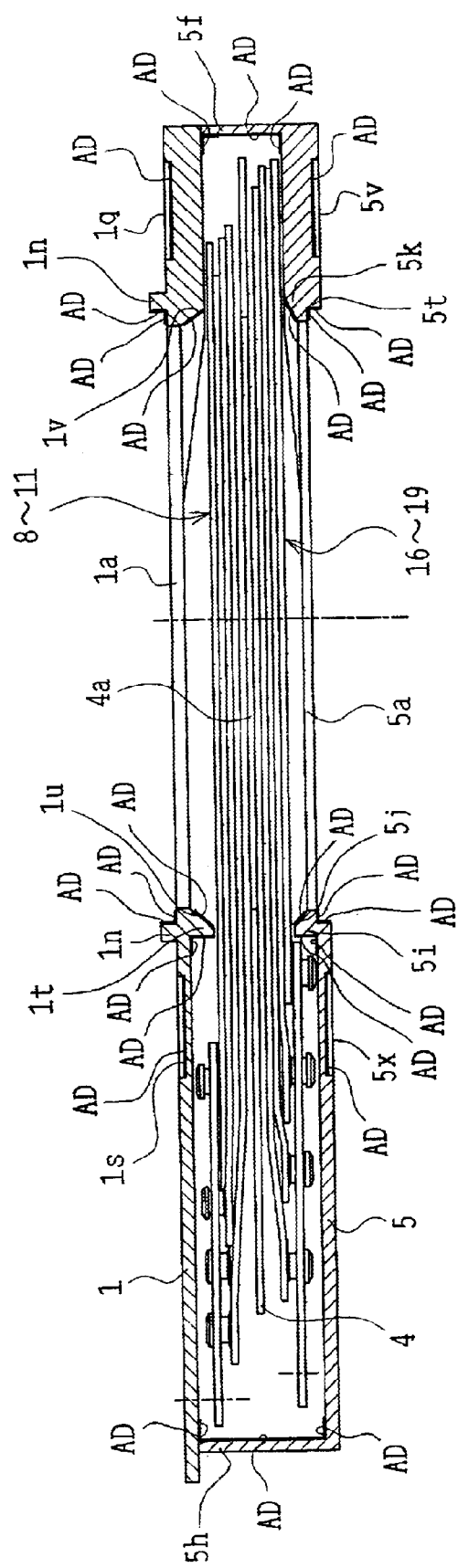
FIG. 12 is a sectional view taken along line B—B in FIG. 10.
Figure 13:
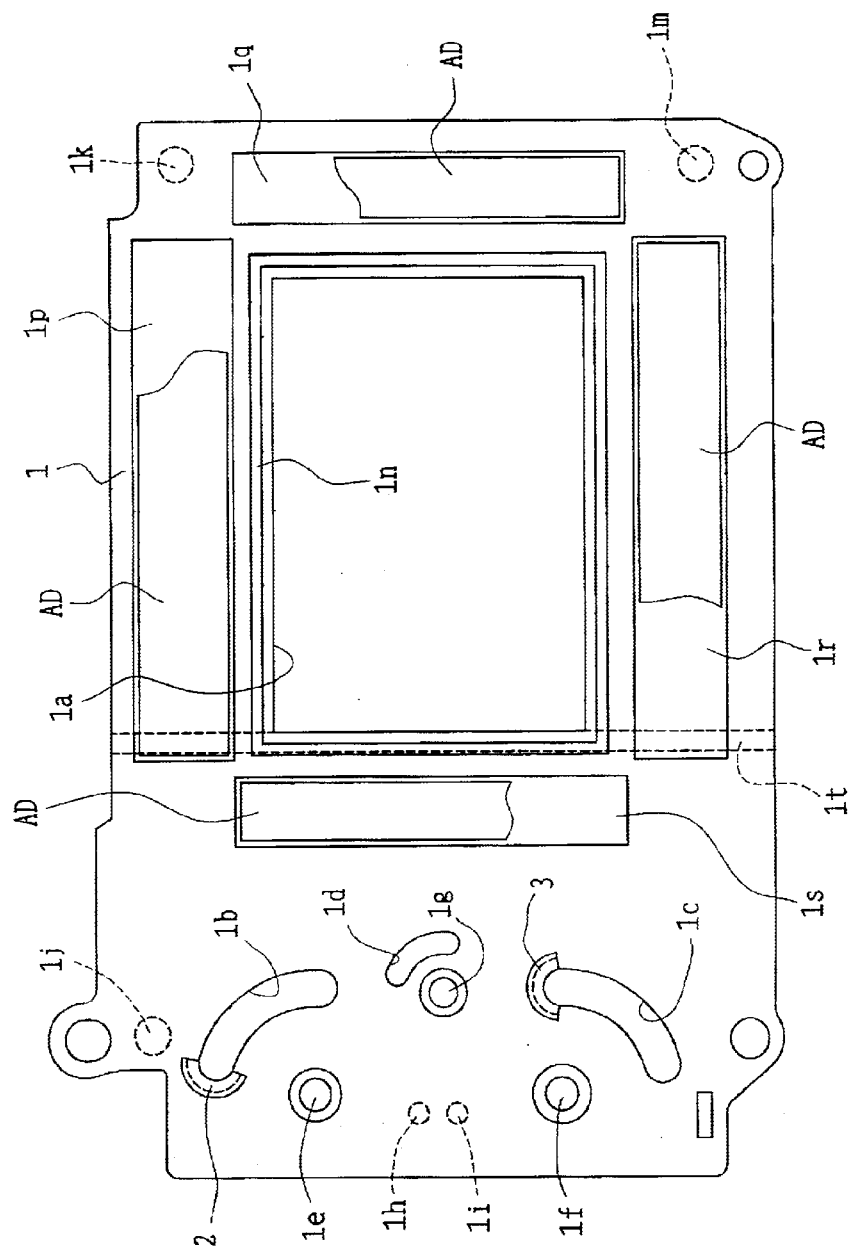
FIG. 13 is a plan view showing a shutter base plate in FIG. 10.

The fourth embodiment of the present invention is explained with reference to FIGS. 10–17. The structure of the fourth embodiment is first described. The shutter base plate 1 shown in FIG. 13 is placed at the most object-side position in FIG. 10. The shutter base plate 1, constructed of synthetic resin, is provided with the aperture 1a for exposure at about the middle and the three arcuate slots 1b, 1c, and 1d on the left side of the aperture. At the upper ends of the slots 1b and 1c, the shock absorbing members 2 and 3 made of butyl rubber, each having a planar shape like a letter C, are mounted in a well-known fashion.

On the shutter base plate 1, the shanks 1e, 1f, 1g, 1h, 1i, 1j, 1k, and 1m are set upright. Of these, the shanks 1e and 1f are set upright on the surface and back sides of the shutter base plate 1, but the shank 1g is set upright on the surface side alone and the shanks 1h, 1i, 1j, 1k, and 1m are provided on the back side alone. On the surface side of the shutter base plate 1, well-known driving members for the first blade group and the second blade group, which are not shown in the figure, are rotatably mounted to the shanks 1e and 1f, and on the back side, the arms of the first blade group and the second blade group are rotatably mounted thereto. The driving pins provided in these driving members pass through the slots 1b and 1c to project on the back side. When the exposure operation is completed, the driving pins abut on the shock absorbing members 2 and 3.

A well-known cocking member, not shown, is rotatably mounted to the shank 1g, and when cocked, it is rotated from the initial position so that the driving members are rotated to cocking positions against biasing forces of their driving springs, while when restored to the initial position, it is stopped in such a way that a pin, not shown, abuts on one end of the slot 1d. The shanks 1h and 1i are provided for the purpose of pivotally mounting the arms of the first blade group and the second blade group, and the shanks 1j, 1k, and 1m are provided for the purpose of mounting an intermediate plate and an auxiliary base plate.

On the surface side of the shutter base plate 1, the frame 1n of rectangular shape is configured to project on the object side so as to surround the aperture 1a, and four shallow troughs 1p, 1q, 1r, and 1s are provided around the frame 1n. On the back side of the shutter base plate 1, the wall it is configured to extend vertically along the left edge of the aperture 1a, and the wall 1t, as shown in FIG. 12, is provided with the inclined face 1u. As seen from FIG. 12, an edge opposite to the edge of the aperture 1a having the wall it is also provided with an inclined face 1v. Moreover, on the back side of the shutter base plate 1, as shown in FIG. 11, a trough 1w is configured at a position opposite to the trough 1p provided on the surface side, with the same shape as the trough 1p, and a trough 1x is configured at a position opposite to the trough 1r provided on the surface side, with the same shape as the trough 1r.

The shutter base plate 1 of such a configuration is such that the adhesive substances AD are applied to surfaces that offer no problem with respect to the function and handling of the shutter. Specifically, as shown in FIG. 13, the adhesive substances AD are applied to the bottom surfaces of the troughs 1p, 1q, 1r, and 1s provided on the surface side of the shutter base plate 1 so as not to project onto the surface of the shutter base plate 1. The adhesive substances AD, as shown in FIGS. 11 and 12, are also applied to the face of the frame 1n directed toward the aperture 1a and a surface directed toward the object side between the frame 1n and the aperture 1a.

Furthermore, on the back side, the adhesive substances AD are applied to the bottom surfaces of the troughs 1w and 1x and to the inclined faces 1u and 1v as well. On the wall 1t, the adhesive substances AD are also applied to a face on the opposite side of the aperture 1a. Although an application region is not clear in FIG. 12, the adhesive substances AD are applied to parts of the back side of the shutter base plate 1 (a face on the left side of the wall 1t connected to the wall 1t, and faces at lateral ends) which are not situated in the working region of the first glade group. Also, for simplicity, in FIGS. 10 and 16, the adhesive substances AD are partially omitted.

The members to be mounted on the back side of the shutter base plate 1 and a structure for mounting the members are the same as in the first embodiment described relative to FIGS. 4B, 4C, 4D, and 5, and thus their explanation is omitted.

Figure 14:
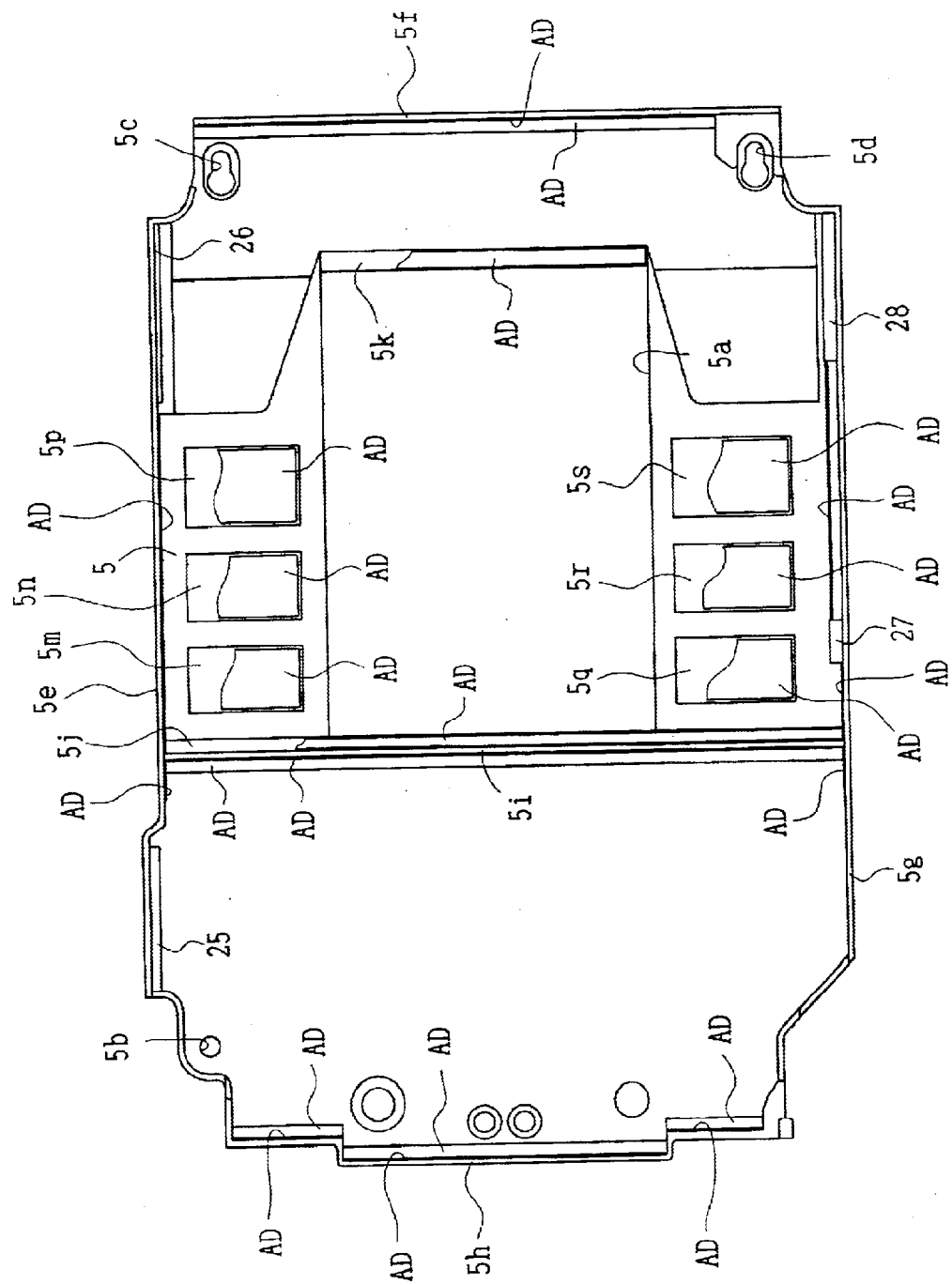
FIG. 14 is a plan view showing an auxiliary base plate used in the fourth embodiment, viewed from the object side.

In FIG. 14, the auxiliary base plate 5 is depicted which constitutes the blade chamber of the second blade group, together with the intermediate plate 4. The auxiliary base plate 5 is constructed of synthetic resin and is provided with the aperture 5a at about the middle. Although the aperture 5a has a shape somewhat larger than the aperture 1a of the shutter base plate 1, it is placed so that the left edge practically overlaps those of the apertures 1a and 4a. On the left side of the aperture 5a, four holes are provided for the purpose of receiving the tops of the four shanks 1e, 1f, 1h, and 1i which are set upright on the shutter base plate 1. In addition, holes 5b, 5c, and 5d are provided at three corners of the auxiliary base plate 5 for the purpose of mounting the auxiliary base plate 5 to the shanks 1j, 1k, and 1m of the shutter base plate 1, and its specific mounting technique will be described later.

The auxiliary base plate 5 is configured with light-blocking walls 5e, 5f, 5g, and 5h on the periphery thereof, and these light-blocking walls are provided for the purpose of preventing light from the periphery from entering the blade chambers. The auxiliary base plate 5 is also provided with the wall 5i extending along the left edge of the aperture 5a to the light-blocking walls 5e and 5g. The wall 5i has the inclined face 5j directed toward the sides of the object and the aperture 1a, and an edge opposite to the edge of the aperture 5a having the wall 5i is also provided with an inclined face 5k.

Figure 15:
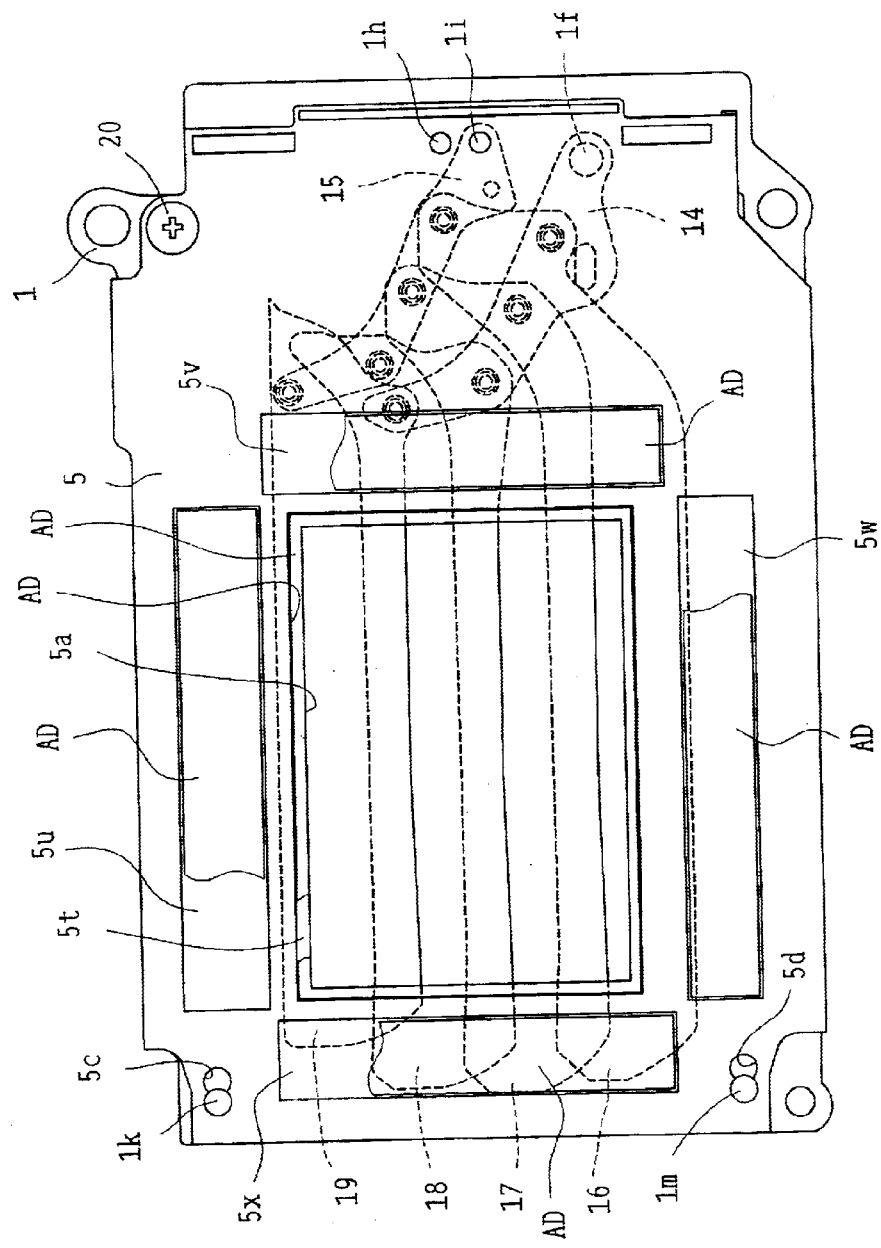
FIG. 15 is a plan view showing the focal-plane shutter in the fourth embodiment, viewed from the image sensor side, immediately after the exposure operation of the second blade group is completed.

On the surface side (the blade chamber side) of the auxiliary base plate 5, shallow troughs 5m, 5n, 5p, 5q, 5r, and 5s are provided at the upper and lower portions of the aperture 5a, three for each portion. Shock absorbing members 25 and 26 are attached to the light-blocking wall 5e, and shock absorbing members 27 and 28 are attached to the light-blocking wall 5g. On the back side of the auxiliary base plate 5, as illustrated in FIGS. 11, 12, and 15, the concavity 5t is configured so as to surround the aperture 5a, and four shallow troughs 5u, 5v, 5w, and 5x are provided around the concavity 5t.

The auxiliary base plate 5 of such a configuration is such that the adhesive substances AD are applied to surfaces that offer no problem with respect to the function and handling of the shutter. Specifically, as shown in FIG. 14, the adhesive substances AD are applied to the bottom surfaces of the troughs 5m, 5n, 5p, 5q, 5r, and 5s provided on the surface side of the auxiliary base plate 5 so as not to project onto the surface of the auxiliary base plate 5. The adhesive substances AD are also applied to the inclined faces 5j and 5k and parts of inside faces of the light-blocking walls 5e and 5g connected to the inclined face 5j. In addition, the adhesive substances AD are applied to the face of the wall 5i on the opposite side of the aperture 5a, to parts of the inside faces of the light-blocking walls 5e and 5g connected to the face of the wall 5i, and to parts of the surface of the auxiliary base plate 5. The adhesive substances AD are also applied to the inside faces of the light-blocking walls 5f and 5h and parts of the surface of the auxiliary base plate 5 connected to these faces. The adhesive substances AD are applied to the upper face of the portion of large thickness of the light-blocking wall 5g provided between the shock absorbing members 27 and 28.

Such adhesive substances AD are also applied to the back side of the auxiliary base plate 5. Specifically, as illustrated in FIG. 15, the adhesive substances AD are applied to the bottom surfaces of the troughs 5u, 5v, 5w, and 5x provided on the back side of the auxiliary base plate 5 so as not to project onto the surface of the auxiliary base plate 5. Moreover, in the concavity 5t, as shown in FIGS. 11 and 12, the adhesive substances AD are applied to a face directed toward the aperture 5a and a face directed toward the image sensor side. Also, for simplicity, in FIGS. 10 and 16, the adhesive substances AD applied to the auxiliary base plate 5 as mentioned above are partially omitted.

The description of the mounting technique of the auxiliary base plate 5 and the arrangement of the CCD 21 and the low-pass filter 22, which is the same as in the first embodiment, is omitted.

Figure 10:
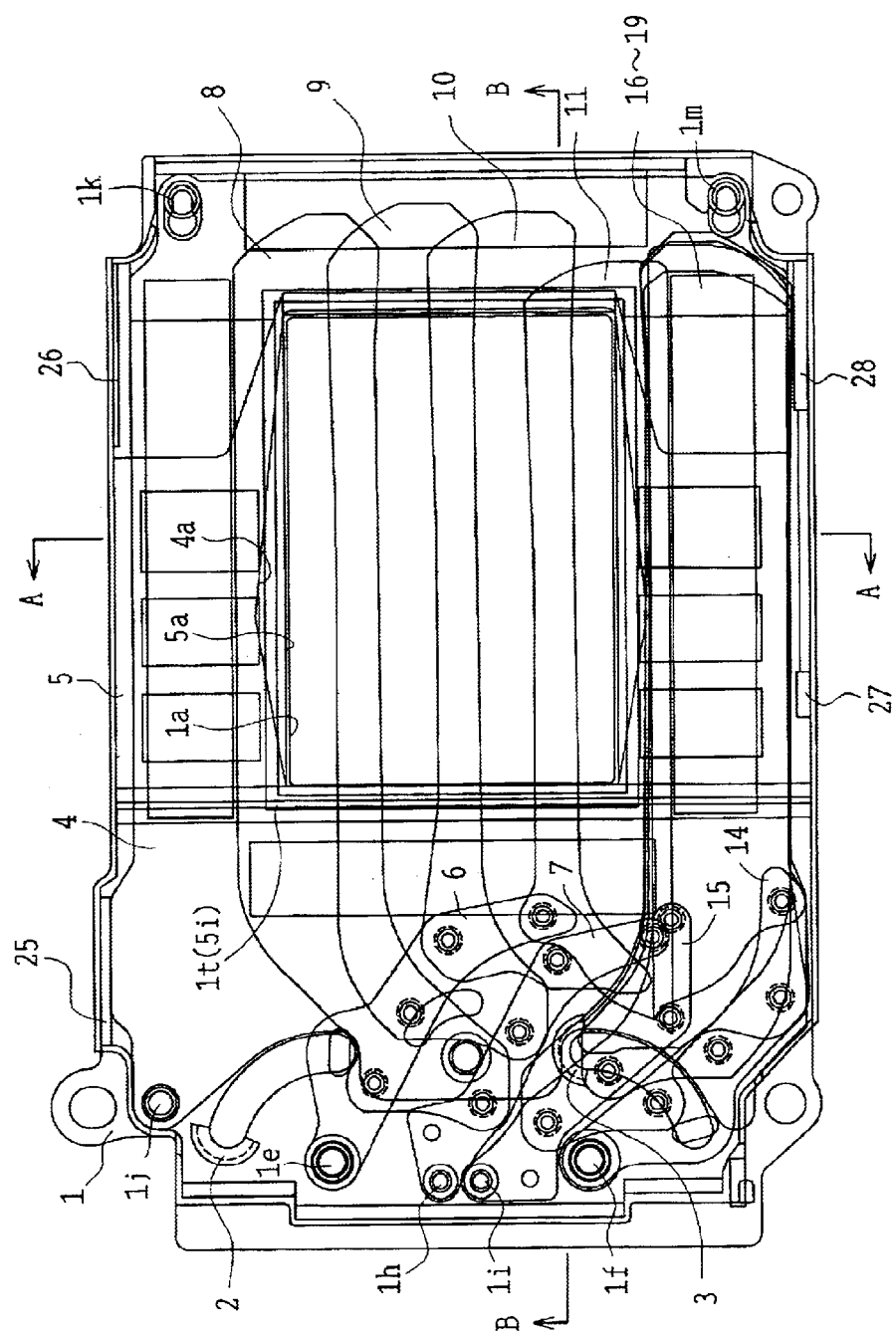
FIG. 10 is a perspective view showing the focal-plane shutter in a fourth embodiment of the present invention, viewed form the object side, that is, the photographic lens side, immediately before the exposure operation is started.

Next, the operation of the fourth embodiment will be described. FIG. 10 depicts the cocking condition of the shutter. In this case, the well-known driving members, not shown, for the first and second blade groups are rotated clockwise by the cocking member, not shown, rotated from the initial position, against the biasing forces of individual driving springs. Consequently, by the driving pins provided in the driving members, the arm 6 for the first blade group and the arm 14 for the second blade group are rotated clockwise so that the four blades 8, 9, 10, and 11 of the first blade group are brought into the spreading condition to cover the aperture 1a, while the four blades 16, 17, 18, and 19 are in the overlapping condition and are housed in the lower portion of the aperture 1a.

In such a cocking condition, when the release button of the camera is pressed, electromagnets, not shown, for the first and second blade groups are first energized, and when the driving members for the first and second blade groups are attracted and retained by the electromagnets, the cocking member is restored to the initial position. Next, when power to the electromagnet for the first blade group is disconnected, a retaining force due to the electromagnet is lost and the driving member for the first blade group is rotated counterclockwise by the biasing force of the driving spring for the first blade group. Hence, the driving pin of the driving member for the first blade group rotates the arm 6 counterclockwise to move upward the four blades 8, 9, 10, and 11 of the first blade group. Consequently, the amount of mutual overlapping of the blades is increased and the aperture 1a is gradually opened by a slit-forming edge which is provided on the lower side of the slit-forming blade 11.

At a stage in which the aperture 1a is fully opened by the slit-forming edge of the slit-forming blade 11, the driving pin of the driving member for the first blade group abuts on the shock absorbing member 2, the arm 6 abuts on the shock absorbing member 25, and the tops of the blades 8–11 abut on the shock absorbing member 26 to stop the movements of the driving member for the first blade group and the first blade group. In this case, the two shock absorbing members 25 and 26 are temporarily compressed, but are not so compressive that the blades 8–11 come in contact with the adhesive substances AD applied to the light-blocking wall 5e of the auxiliary base plate 5. Consequently, as seen from FIG. 11, the adhesive substances AD can be applied to a wide area of the inside face of the light-blocking wall 5e.

In the first embodiment, during the above operation, the tops of the arms 6 and 7 do not pass the area of the aperture 1a, and thus the joint shanks 12 and 13 also do not pass the area of the aperture 1a, as a matter of course. As such, since the heads of the joint shanks 12 and 13 do not abut on the end of the edge of the aperture 1a or on the surface of the shutter base plate 1 on the blade chamber side at a portion close thereto, it is avoidable that relatively large wear dust particles are produced copiously. In this operation, however, relatively large wear dust particles may be produced between the arms 6 and 7 and the eight joint shanks and between the heads of the eight joint shanks and the surface of the shutter base plate 1 on the blade chamber side.

Although such relatively large wear dust particles and relatively many wear dust particles are not produced between the blades, between the blades and the shutter base plate 1, or between the blades and the intermediate plate 4, it is not that they are not entirely produced. Wear dust produced in the past photography, or wear dust produced outside the shutter mechanism and dirt penetrating into the camera settle in the blade chambers or in the proximity of the outside of the shutter. In the operation of the first blade group, therefore, wear dust produced by the operation or wear dust and dirt which have settled will be raised in the air.

In the fourth embodiment, however, in FIG. 10, most of wear dust and dirt raised on the left side of the wall 1t are blocked by the wall 1t and fail to advance toward the aperture 1a. After the completion of the operation, such dust and dirt adhere to the adhesive substances AD applied in the blade chamber of the first blade group and the surfaces of other members. The dust and dirt adhering to the adhesive substances AD will not be raised again. In FIG. 10, although wear dust and dirt raised on the right side of the wall 1t are slighter than those raised on the left side, they also adhere to the adhesive substances AD applied to the inclined faces 1u and 1v and the blade chamber of the first blade group. Although the possibility is low, wear dust and dirt penetrating into the blade chamber of the second blade group adhere to the adhesive substances AD in the blade chamber of the second blade group. Wear dust and dirt raised outside the blade chambers adhere to the adhesive substances AD applied to the outsides of the shutter base plate 1 and the auxiliary base plate 5. Consequently, dust and dirt advancing toward the low-pass filter 22 are extremely slight, and some of them adhere to the adhesive substances AD applied to the inclined faces 5j and 5k.

When a preset time passes after power to the electromagnet for the first blade group is disconnected as mentioned above, power to the electromagnet for the second blade group is now disconnected. As is well known, timing where power to the electromagnet for the second blade group is disconnected is various, depending on the photographing condition, and actually the power is often disconnected before the exposure operation of the first blade group is completed. In the operation of the first embodiment, however, for convenience, the following description is given in the case where the power is disconnected after the exposure operation of the first blade group is completed, as stated above.

Figure 16:
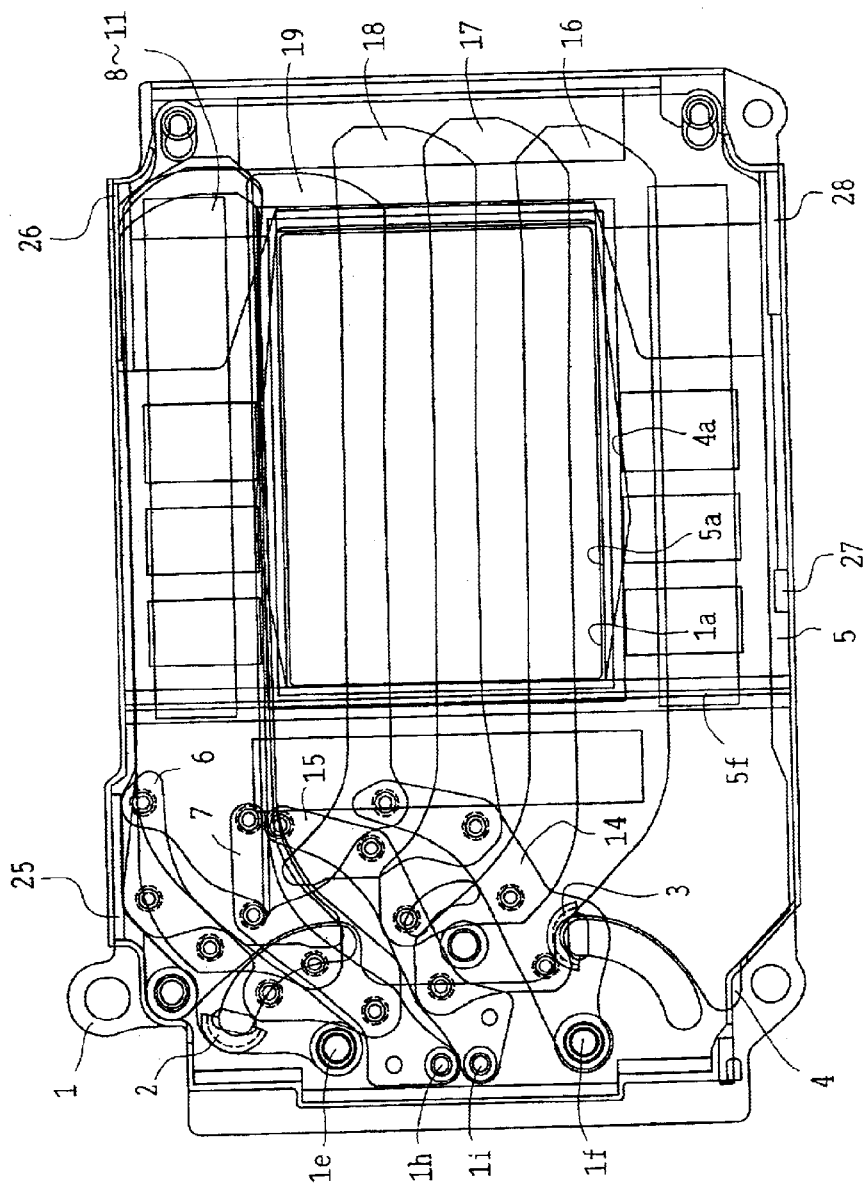
FIG. 16 is a perspective view showing the focal-plane shutter in the fourth embodiment, viewed from the object side, immediately after the exposure operation is completed.

When power to the electromagnet for the second blade group is disconnected, the driving member for the second blade group is rotated counterclockwise by the biasing force of the driving spring for the second blade group. As a result, the driving pin of the driving member for the second blade group rotates the arm 14 counterclockwise to move upward the four blades 16, 17, 18, and 19 of the second blade group. Hence, the amount of mutual overlapping of the blades is reduced and the aperture 1a is gradually closed by a slit-forming edge which is provided on the upper side of the slit-forming blade 19. At a stage in which the aperture 1a is closed by the slit-forming edge of the slit-forming blade 19, the driving pin of the driving member for the second blade group abuts on the shock absorbing member 3 to stop the movements of the driving member for the second blade group and the second blade group. This stop condition is shown in FIGS. 15 and 16.

In this exposure operation of the second blade group, the operations of the arms 14 and 15 are performed on the left side of the wall 5i configured on the auxiliary base plate 5. The tops of these arms do not pass the area of the aperture 5a, and thus two joint shanks used in the pivotally supporting structure of the slit-forming blade 19 also do not pass the area of the aperture 5a, as a matter of course. As such, since the heads of the joint shanks do not abut on the face of the edge of the aperture 5a or on the surface of the auxiliary base plate 5 on the blade chamber side at a portion close thereto, it is avoidable that wear dust is produced by such abutment as in the conventional shutter.

However, as in the operation of the first blade group, wear dust and dirt are raised to a greater or less extent. Specifically, in this operation, relatively many wear dust particles may be produced between the arms 14 and 15 and the eight joint shanks and between the heads of the eight joint shanks and the surface of the auxiliary base plate 5 on the blade chamber side. The wear dust produced in this way is raised, together with wear dust and dirt that have settled on the surfaces of members not coated with the adhesive substances. Most of them are blocked from advancing to the aperture 5a by the wall 5i and after the completion of the operation, adhere to the adhesive substances AD applied in the blade chamber of the second blade group and the surfaces of other members. The dust and dirt adhering to the adhesive substances AD will not be raised again.

In FIG. 10, although wear dust and dirt raised on the right side of the wall 5i are slighter than those raised on the left side, they also adhere to the adhesive substances AD applied in the blade chamber of the second blade group, and wear dust and dirt penetrating into the blade chamber of the first blade group adhere to the adhesive substances AD of the inclined faces 1u and 1v and the blade chamber of the first blade group. Wear dust and dirt raised outside the blade chambers adhere to the adhesive substances AD applied to the outsides of the shutter base plate 1 and the auxiliary base plate 5. Some of dust and dirt advancing toward the low-pass filter 22 adhere to the adhesive substances AD applied to the inclined faces 5j and 5k. Consequently, wear dust and dirt reaching the low-pass filter 22 are extremely slight.

As seen from the above description, the walls 1t and 5i are provided for the purpose of preventing the wear dust from advancing toward the low-pass filter 22, and thus, originally, the walls 1t and 5i may be configured only at the edges of the apertures 1a and 5a, respectively. In the fourth embodiment, however, the walls 1t and 1i are extended to the upper and lower ends of the base plates 1 and 5, respectively, in order to check the advance of the dust.

The height of each of the walls 1t and 5i (the dimension of a projection on the blade chamber side) in the fourth embodiment is uniform. Gaps between the tops of the walls 1t and 5i and the intermediate plate 4 are determined in consideration of dimensions where respective four blades of the first and second blade groups are overlapped. However, when the first blade group or the second blade group is in the spreading condition, each of the gaps which corresponds practically to the thickness of two blades is enough. Thus, if the gaps are not uniformed so that the heights of the walls 1t and 5i change gradually, the blocking effect of wear dust and dirt will be further improved. In the present invention, however, the walls 1t and 5i are not limited to such shape and are not necessarily required. However, if only one wall is provided, it is needless to say that the wall 5i of the auxiliary base plate 5 close to the low-pass filter 22 should be placed.

Subsequently, the cocking operation of the shutter will be explained. In FIG. 16, when the cocking member, not shown, begins to rotate, the driving member for the first blade group is first rotated clockwise against the biasing force of the driving spring for the first blade group. Whereby, the arm 6 is rotated clockwise by the driving pin of the driving member for the first blade group, and thus the blades 8, 9, 10, and 11 of the first blade group are moved downward while reducing the amount of mutual overlapping. At the stage in which the amount of overlapping of the slit-forming blade 11 of the first blade group and the slit-forming blade 19 of the second blade group reaches a predetermined value, the cocking member starts to rotate the driving member for the second blade group in a clockwise direction against the biasing force of the driving spring for the second blade group. As a result, since the arm 14 is rotated clockwise by the driving pin for the second blade group, the blades 16, 17, 18, and 19 of the second blade group are moved downward while increasing the amount of mutual overlapping.

In this way, the cocking operation is performed with respect to the first and second blade groups. Actually, this cocking operation is rapidly performed. Hence, immediately after the blades 8, 9, 10, and 11 of the first blade group are brought into the spreading condition to cover the aperture 1a, the rotation of the cocking member, not shown, is stopped. However, since the pivotally supported portions of the first and second blade groups have tolerances, each of the blades is somewhat rotated clockwise by the force of inertia, with a pivotally supported portion as its supporting point. In this case, therefore, the blades 16, 17, 18, and 19 of the second blade group are brought into the overlapping condition to abut on the shock absorbing members 27 and 28, and then are somewhat returned to stop in a state of FIG. 10.

According to the fourth embodiment, as mentioned above, wear dust and dirt raised in the blade chambers adhere to the adhesive substances AD applied to the surfaces of the blade chambers so that the operations of the first and second blade groups are not affected. Thus, the amount of wear dust reaching the sides of the apertures 1a and 5a is materially reduced in cooperation with the functions of the wall 1t and 5i. Some of particles of the wear dust reaching the sides of the apertures 1a and 5a adhere to the adhesive substances AD applied to the inclined faces 1u, 1v, 5j, and 5k, and hence the amount of dust reaching the low-pass filter 22 is highly limited. Some of dust particles advancing outside the shutter and settling initially in the outside of the shutter adhere to the adhesive substances AD applied to surfaces outside the shutter base plate 1 and the auxiliary base plate 5. Consequently, the amount of dust reaching the low-pass filter 22 is limited.

Also, although in the fourth embodiment reference has been made to the case where the adhesive substances applied directly to the shutter base plate and the auxiliary base plate, (adhesive) tapes which are previously coated or impregnated with the adhesive substances may be stuck on the surfaces of the shutter base plate and the auxiliary base plate, or may be used in combination with the adhesive substances. Such adhesive means may be provided on only one of the shutter base plate and the auxiliary base plate. If the antireflection substances are included in the adhesive means, it is avoidable that light reflected by the surfaces of the base plates reaches the imaging surface in photography and the film is exposed to light when the camera is not used.

Figure 17:
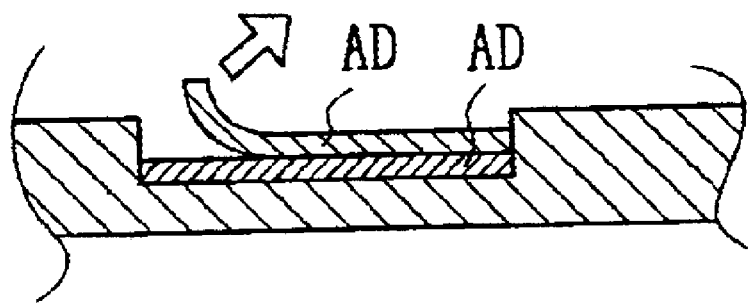
FIG. 17 is a view for explaining the case where adhesive tapes are used.

In the above adhesive means (adhesive tapes), it is conceivable that the adhesive forces of the adhesive means are weakened by use for a long period of time. As such, the adhesive means with two sheets or a plurality of sheets, not to speak of one sheet, is provided so that the sheets overlap. After the adhesive force is weakened, as shown in FIG. 17, the uppermost (most surface-side) sheet (tape) is merely peeled off and thereby a new adhesive face can be exposed to revive the adhesive force, not that the adhesive means is stuck again when necessary. When a plurality of sheets of the adhesive means are superposed, it is easy to peel off the sheets if the sheets have different dimensions. It is also considered that the back face of the surface-side sheet is made with a process and substance such that the adhesive force is not weakened, and can be peeled off. The above description also holds for the case of the third embodiment.

In the fourth embodiment, reference has been made to the case of use in the digital camera, but the present invention is also applicable to the film camera. Even when the present invention is used in the digital camera, the shutter may be designed so that a single shutter blade group is provided and a single blade chamber is constructed with the shutter base plate and the auxiliary base plate. Although in the fourth embodiment each of the shutter blade groups has four blades, the present invention is not limited to this number of blades, and five blades, not to speak of a single blade, may be used. From the above description, therefore, the present invention is effective when applied not only to the focal-plane shutter, but also to a behind-the-lens shutter (a lens shutter located at the position of the rear of a photographic lens).

The present invention, as mentioned above, is provided with the adhesive means on at least one of the shutter base plate and the auxiliary base plate so that the operations of the shutter blade groups are not affected. Hence, wear dust produced in the operations of the shutter blade groups and wear dust and dirt which have already been produced adhere favorably to the adhesive means, and adhering wear dust and dirt are not raised again in the air. Consequently, wear dust and dirt which reach and adhere to the imaging surface can be highly limited.

What is claimed is:

1. A focal-plane shutter for a camera, comprising:
   two base plates, each having an aperture for exposure at about a middle thereof, said two base plates being arranged on an object side and on an imaging surface side, respectively, to form a single blade chamber therebetween or to form two blade chambers into which a space between said two base plates is partitioned by an intermediate plate having an aperture for exposure at about a middle thereof,
   wherein a shutter blade group placed in each of said two blade chambers comprises a plurality of arms whose pivotal ends are pivotally mounted to one of said two base plates at a side of said aperture and at least one blade pivotally supported by said arms through individual joint shanks and is arranged so that working paths of said joint shanks fail to run inside the apertures of said two base plates, and
   wherein at least one of said two base plates is provided with a wall projected toward a blade chamber side, said wall being located between the joint shanks that are arranged on distal ends of said arms opposite to said pivotal ends thereof and an edge of said aperture, to extend along said edge of said aperture, and having an inclined face directed toward said aperture of an opposite base plate.

2. A focal-plane shutter for cameras according to claim 1, wherein said inclined face is configured and thereby a dimension of an end face of said aperture in a direction parallel with an optical axis is smaller than a thickness of one of said two base plates, provided with said inclined face.

3. A focal-plane shutter for cameras according to claim 2, wherein said wall is provided to extend to an outer edge of at least one of said two base plates.

4. A focal-plane shutter for cameras according to claim 3, wherein said wall is integrally molded out of synthetic resin or is configured through a knockout process and a press process of a metallic plate.

5. A focal-plane shutter for cameras according to claim 1, wherein said intermediate plate is mounted to partition said single blade chamber between said two base plates so that said intermediate plate is fixed relative to said two base plates.

6. A focal-plane shutter for cameras according to claim 1, wherein said shutter blade group has a plurality of blades and said wall provided on a side of said blade chamber of each of said shutter blade group is configured so that an amount of projection is increased in a direction in which blades of said shutter blade group are spread.

7. A focal-plane shutter for cameras according to claim 1, wherein adhesive substances are applied to or stuck on faces of said wall located on a side of said working region of said arms.

8. A focal-plane shutter for cameras according to claim 7, wherein said adhesive substances are also used as antireflection substances.

9. A focal-plane shutter for cameras according to claim 1, wherein one of said two base plates, placed on said imaging surface side, has a concavity for receiving a part of a low-pass filter or an image sensor so as to surround said aperture on said imaging surface side.

10. A focal-plane shutter for a camera, said focal-plane shutter being provided with a blade chamber between two base plates, each having an aperture for exposure, said blade chamber housing a shutter blade group that comprises a plurality of arms whose pivotal ends are pivotally mounted to one of said two base plates at a side of said aperture and at least one blade pivotally supported by said arms through individual joint shanks, or two blade chambers into which a space between said two base plates is partitioned, said two blade chambers housing different shutter blade groups, respectively,
   wherein at least one of said two base plates is provided with adhesive means on surfaces with which said shutter blade group has no contact to operate.

11. A focal-plane shutter for cameras according to claim 10, wherein said adhesive means are provided in troughs configured on at least one of said two base plates.

12. A focal-plane shutter for cameras according to claim 10, wherein a frame is configured so as to surround said aperture, outside said blade chamber, on at least one of said two base plates and is provided with said adhesive means.

13. A focal-plane shutter according to claim 10, wherein at least one of said two base plates has a wall extending from said aperture to peripheral ends of said base plate along said aperture on a blade chamber side and is provided with said adhesive means on at least one of a surface on said blade chamber side and a face of said wall nonparallel with said surface.

14. A focal-plane shutter according to claim 13, wherein said wall is interposed between a working region of said arms and said aperture.

15. A focal-plane shutter for cameras according to claim 10, wherein said adhesive means have an antireflection function.

* * * * *